(12) United States Patent
Wang et al.

(10) Patent No.: US 11,045,014 B2
(45) Date of Patent: Jun. 29, 2021

(54) DEVICE FOR CARRYING AND TRANSPORTING A BABY

(71) Applicant: BridgeHub LLC, San Jose, CA (US)

(72) Inventors: Yongmei Wang, Beijing (CN); Ting Wang, Shandong (CN); Xinlin Ye, Beijing (CN); Jianyong Zhou, Beijing (CN)

(73) Assignee: BridgeHub LLC, San Jose, CA (US)

( * ) Notice: Subject to any disclaimer, the term of this patent is extended or adjusted under 35 U.S.C. 154(b) by 0 days.

(21) Appl. No.: 16/755,264

(22) PCT Filed: Oct. 13, 2017

(86) PCT No.: PCT/CN2017/106048
§ 371 (c)(1),
(2) Date: Apr. 10, 2020

(87) PCT Pub. No.: WO2019/071570
PCT Pub. Date: Apr. 18, 2019

(65) Prior Publication Data
US 2020/0237115 A1   Jul. 30, 2020

(51) Int. Cl.
*B62B 7/06* (2006.01)
*A47D 13/02* (2006.01)
(Continued)

(52) U.S. Cl.
CPC .......... *A47D 13/025* (2013.01); *A47D 15/00* (2013.01); *A41D 2400/482* (2013.01);
(Continued)

(58) Field of Classification Search
CPC ...... A47D 13/02; A47D 13/025; F16M 11/28; F16M 11/32; B62B 5/023; B62B 5/082;
(Continued)

(56) References Cited

U.S. PATENT DOCUMENTS 690,122 A   12/1901   Slagle
2,099,345 A   11/1937   Olszanowski
(Continued)

FOREIGN PATENT DOCUMENTS

CN   206137435   5/2013
CN   104856508   8/2015
(Continued)

OTHER PUBLICATIONS

PCT International Preliminary Report on Patentability in International Appln. No. PCT/CN2017/106048, dated Apr. 23, 2020, 5 pages.
PCT International Preliminary Report on Patentability in International Appln. No. PCT/US2015/023537, dated Oct. 4, 2016, 6 pages.
PCT International Search Report and Written Opinion in International Appln. No. PCT/CN2017/106048, dated Oct. 24, 2017, 8 pages.
(Continued)

*Primary Examiner* — Justin M Larson
(74) *Attorney, Agent, or Firm* — Fish & Richardson P.C.

(57) ABSTRACT

An example baby carrier includes an enclosure, a seat configured to receive a baby, a back frame, and a first support frame. The first support frame includes an extendable arm having a handle, a first hinged leg, and a first wheel mounted to the first leg. The baby carrier is configured to reversibly transition between at least a stowed mode, a stroller mode, and a carrier mode.

15 Claims, 17 Drawing Sheets

(51) Int. Cl.
*A45F 3/04* (2006.01)
*A47D 15/00* (2006.01)
*B62B 5/00* (2006.01)
*B62B 7/12* (2006.01)

(52) U.S. Cl.
CPC ....... *A45F 2003/045* (2013.01); *B62B 5/0023* (2013.01); *B62B 7/12* (2013.01); *B62B 2206/006* (2013.01)

(58) Field of Classification Search
CPC ........... B62B 7/00; B62B 7/002; B62B 7/006; B62B 7/06; B62B 7/08; B62B 7/10; B62B 7/12; B62B 2206/006; A45F 2003/003
See application file for complete search history.

(56) References Cited

U.S. PATENT DOCUMENTS

| | | |
|---|---|---|
| 2,822,117 A | 2/1958 | Mack |
| 2,844,905 A | 7/1958 | Musser et al. |
| 3,103,375 A | 9/1963 | McMullin |
| 3,893,730 A | 7/1975 | Homier et al. |
| 3,984,115 A | 10/1976 | Miller |
| 4,101,163 A | 7/1978 | Morin |
| 4,160,553 A | 7/1979 | Fleischer |
| 4,232,896 A | 11/1980 | Caldwell et al. |
| 4,253,658 A | 3/1981 | Fleischer |
| 4,366,981 A | 1/1983 | Ziegler et al. |
| 4,385,849 A | 5/1983 | Crain |
| 4,467,945 A | 8/1984 | Schaapveld |
| 4,528,998 A | 7/1985 | Gamm |
| 4,746,044 A | 5/1988 | Arvizu et al. |
| 4,790,459 A | 12/1988 | Moseley |
| 4,932,719 A | 6/1990 | Gonzalez y. Rojas |
| 4,948,120 A | 8/1990 | Krueger et al. |
| 4,976,494 A | 12/1990 | Polley |
| 5,005,902 A | 4/1991 | Farnworth et al. |
| 5,167,306 A | 12/1992 | Carrigan, Jr. |
| 5,188,138 A | 2/1993 | Yamasaki |
| 5,205,450 A | 4/1993 | Derosier |
| 5,222,641 A | 6/1993 | Medeiros, Jr. |
| 5,242,212 A | 9/1993 | Polley |
| 5,295,565 A | 3/1994 | Latshaw |
| 5,315,795 A | 5/1994 | Chae et al. |
| 5,380,023 A | 1/1995 | McBee |
| 5,395,154 A * | 3/1995 | Wang ................ A47D 1/02 280/30 |
| D357,438 S | 4/1995 | Hsia |
| 5,425,526 A | 6/1995 | Shen |
| 5,431,478 A * | 7/1995 | Noonan ............. B60N 2/2848 297/130 |
| 5,441,186 A | 8/1995 | Halligan |
| 5,509,590 A | 4/1996 | Medeiros et al. |
| 5,575,448 A | 11/1996 | Battocchio |
| 5,641,147 A | 6/1997 | Pena |
| 5,662,429 A | 9/1997 | Battocchio |
| 5,664,758 A | 9/1997 | Smith |
| 5,676,287 A | 10/1997 | Huang |
| 5,769,104 A | 6/1998 | Uemura |
| 5,769,431 A | 6/1998 | Cordova |
| 5,848,741 A | 12/1998 | Fair et al. |
| 5,868,292 A | 2/1999 | Stephens et al. |
| 5,899,467 A * | 5/1999 | Henkel .................. A45C 5/14 280/47.25 |
| 5,921,628 A | 7/1999 | Glockl |
| 5,927,797 A | 7/1999 | Ferguson |
| 5,964,470 A | 10/1999 | Syendsen et al. |
| 5,971,341 A | 10/1999 | Pfister |
| 6,006,970 A | 12/1999 | Piatt |
| 6,062,638 A | 5/2000 | Ferguson |
| 6,241,313 B1 * | 6/2001 | Lenz ..................... A47D 1/10 297/188.06 |
| 6,345,745 B1 | 2/2002 | Harriss |
| 6,443,339 B1 | 9/2002 | Higuchi |
| 6,467,559 B1 | 10/2002 | Farrell et al. |
| 6,594,856 B1 | 7/2003 | Cherukuri |
| 6,662,916 B2 | 12/2003 | Tiramani et al. |
| 6,663,071 B2 | 12/2003 | Peterson |
| 6,719,257 B1 | 4/2004 | Greene et al. |
| 6,783,135 B1 | 8/2004 | Nord |
| 6,789,710 B1 | 9/2004 | Szatkowski |
| 6,854,916 B2 | 2/2005 | Hsieh |
| 6,866,174 B2 | 3/2005 | Hiscocks |
| 6,877,805 B1 | 4/2005 | Steadman |
| 6,883,530 B2 | 4/2005 | Kawakami |
| 7,104,203 B2 | 9/2006 | Lo |
| 7,143,912 B2 * | 12/2006 | Caneba ................ A45C 13/262 224/153 |
| 7,163,228 B2 * | 1/2007 | Faber .................... B62B 5/0023 280/651 |
| 7,344,320 B2 | 3/2008 | Barker et al. |
| 7,354,049 B2 * | 4/2008 | Schmidt .................... A45C 9/00 280/33.993 |
| 7,396,083 B2 | 7/2008 | Kasner |
| 7,547,067 B2 | 6/2009 | Keilhauer et al. |
| 7,594,696 B2 | 9/2009 | Girard |
| 7,610,711 B2 | 11/2009 | Oz |
| 7,673,942 B2 | 3/2010 | Tuckey et al. |
| 7,686,195 B2 | 3/2010 | Bangert |
| 7,775,548 B2 | 8/2010 | Mcintyre et al. |
| 7,823,599 B2 | 11/2010 | Thibodeau et al. |
| 7,845,602 B1 | 12/2010 | Young et al. |
| 7,883,426 B2 | 2/2011 | Bellows et al. |
| 7,992,584 B1 | 8/2011 | Birnbaum |
| 8,020,879 B1 | 9/2011 | Engdahl |
| 8,020,881 B2 | 9/2011 | Stump et al. |
| 8,028,963 B2 | 10/2011 | Speggiorin |
| 8,056,779 B1 | 11/2011 | Brunwin |
| 8,087,688 B2 * | 1/2012 | Gilbertson ................ B62B 7/06 280/642 |
| 8,147,345 B2 | 4/2012 | Furman |
| 8,156,581 B2 | 4/2012 | Fogleman |
| 8,157,225 B2 | 4/2012 | Kephart |
| 8,161,956 B2 | 4/2012 | Bednar |
| 8,182,030 B1 * | 5/2012 | Britten ................. A47D 13/025 297/129 |
| 8,286,977 B2 | 10/2012 | Butler et al. |
| 8,292,365 B2 | 10/2012 | Lu et al. |
| 8,403,408 B2 | 3/2013 | Hosier |
| 8,443,538 B1 | 5/2013 | Moody |
| 8,464,919 B1 | 6/2013 | Goozdich |
| 8,500,140 B1 | 8/2013 | Liao |
| 8,523,028 B1 | 9/2013 | Young |
| 8,534,427 B2 | 9/2013 | Kumazawa |
| 8,540,314 B2 | 9/2013 | Fernandez |
| 8,556,349 B2 | 10/2013 | Welch et al. |
| 8,584,622 B2 | 11/2013 | Nishino |
| 8,641,056 B1 | 2/2014 | Carter |
| 8,708,206 B2 * | 4/2014 | Onessimo ................ A45C 3/00 224/576 |
| 8,876,146 B2 * | 11/2014 | Smith, Jr. ............... B62B 7/062 280/642 |
| 8,893,937 B1 | 11/2014 | Bristol |
| 8,894,089 B2 * | 11/2014 | Clifton ..................... B62B 9/26 280/642 |
| 9,056,619 B2 * | 6/2015 | Tran ......................... B62B 7/08 |
| 9,168,941 B2 * | 10/2015 | Millman-Wood ........ B62B 7/12 |
| 9,357,853 B2 | 6/2016 | Oh |
| 10,709,261 B2 * | 7/2020 | Wang ..................... B62B 7/044 |
| 2002/0050112 A1 | 5/2002 | Koch et al. |
| 2003/0192925 A1 | 10/2003 | Boone |
| 2005/0242630 A1 | 11/2005 | Miller |
| 2006/0163305 A1 | 7/2006 | Tong |
| 2006/0240960 A1 | 10/2006 | Shahinpoor |
| 2008/0042378 A1 | 2/2008 | Dick |
| 2008/0042379 A1 | 2/2008 | Amran |
| 2009/0032558 A1 | 2/2009 | Klein, II |
| 2009/0066045 A1 * | 3/2009 | Turner ..................... A45F 3/04 280/30 |
| 2010/0051657 A1 | 3/2010 | Onessimo et al. |
| 2010/0301587 A1 | 12/2010 | Gilbertson et al. |
| 2011/0109138 A1 | 5/2011 | Inoue et al. |

(56) References Cited

U.S. PATENT DOCUMENTS

| | | |
|---|---|---|
| 2011/0198905 A1 | 8/2011 | Welch et al. |
| 2012/0006949 A1 | 1/2012 | Laird et al. |
| 2012/0152988 A1 | 6/2012 | Green, III |
| 2012/0161408 A1 | 6/2012 | Sidhu |
| 2012/0306181 A1 | 12/2012 | Clifton |
| 2013/0047331 A1 | 2/2013 | Parker et al. |
| 2013/0228602 A1 | 9/2013 | Thiruppathi |
| 2014/0312599 A1 | 10/2014 | Millman-Wood |
| 2015/0230623 A1 | 8/2015 | Oh et al. |
| 2015/0282636 A1* | 10/2015 | Wang ............... A47D 13/025 297/452.1 |
| 2016/0106228 A1* | 4/2016 | Wang ............... A47D 13/025 224/159 |
| 2017/0129524 A1* | 5/2017 | Wang ..................... B62B 7/06 |
| 2018/0093692 A1* | 4/2018 | Xu ...................... B62B 5/0023 |
| 2018/0146757 A1* | 5/2018 | Singh Johar ............. B62B 7/12 |
| 2019/0254399 A1* | 8/2019 | Rajvansh ................. A45C 5/14 |
| 2020/0253347 A1* | 8/2020 | Morris ..................... A47D 1/02 |

FOREIGN PATENT DOCUMENTS

| | | |
|---|---|---|
| EP | 0355223 | 2/1990 |
| EP | 1746378 | 1/2007 |
| FR | 2997826 | 5/2014 |
| GB | 0678225 | 8/1952 |
| GB | 2270619 | 3/1994 |
| KR | 20100029641 | 3/2010 |
| KR | 101219312 | 1/2013 |

OTHER PUBLICATIONS

PCT International Search Report and Written Opinion of the International Searching Authority, PCT Application No. PCT/US2015/023537, dated Jul. 1, 2015, 11 pages.

\* cited by examiner

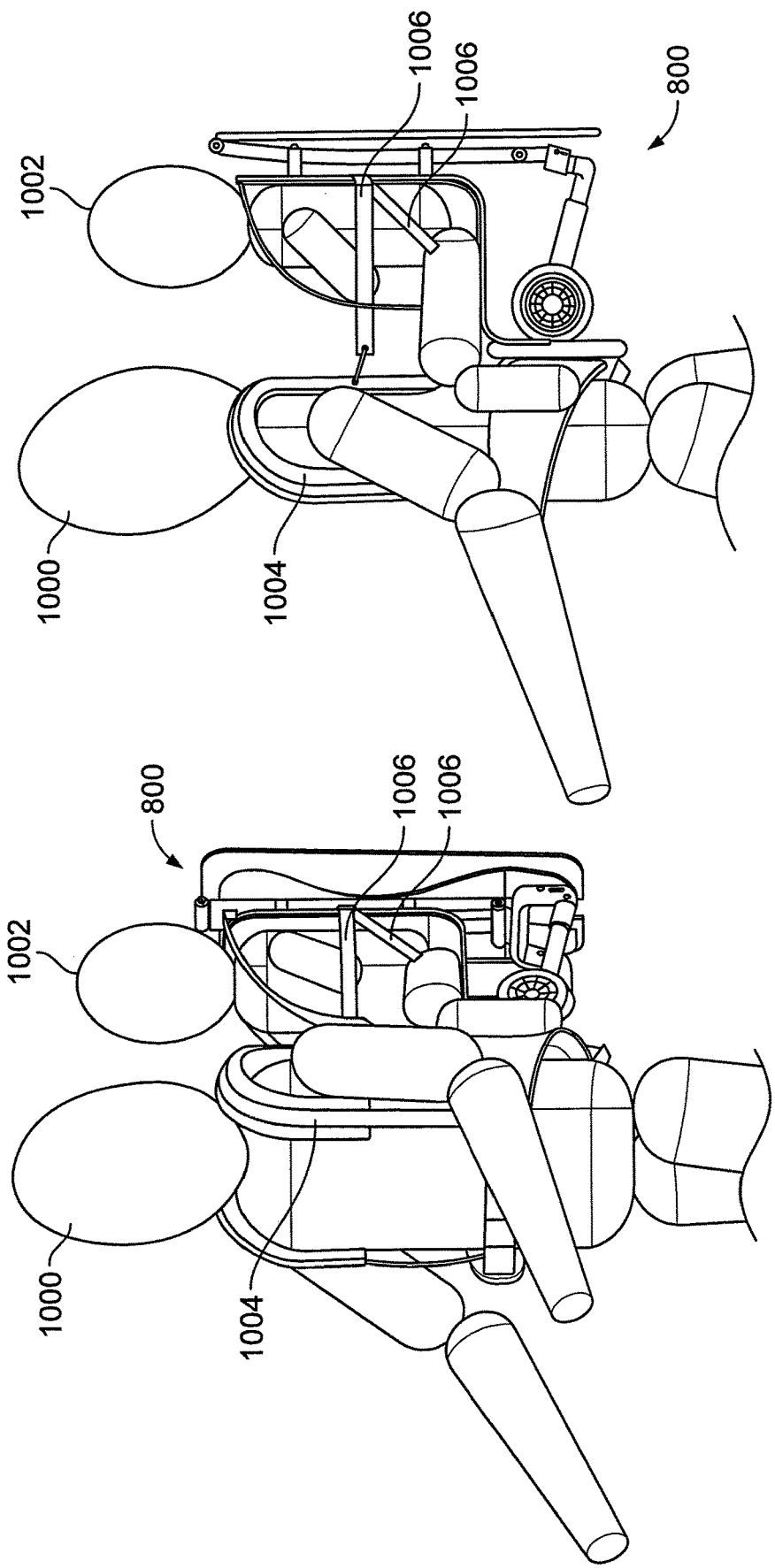

DEVICE FOR CARRYING AND TRANSPORTING A BABY

CROSS-REFERENCE TO RELATED APPLICATIONS

This application is a National Stage application under 35 U.S.C. § 371 of International Application No. PCT/CN2017/106048, having an International Filing Date of Oct. 13, 2017. The disclosure of the prior application is considered part of the disclosure of this application, and is incorporated in its entirety into this application.

TECHNICAL FIELD

The disclosure relates to devices for carrying and transporting a baby.

BACKGROUND

Baby carriers are devices that assist a user in carrying and transporting a baby. Conventional baby carriers often deploy a flexible strap or rigged harness that attaches the baby to the upper body of an adult. When carrying the baby for an extended period of time, the weight of the baby can inflict physical stress on the body of the carrying adult, resulting in discomfort. Additionally, many baby carriers specify a carrying weight upper bound that prevents use of the baby carrier for heavier babies or toddlers.

SUMMARY

Various implementations of a baby carrier are described herein. In an example implementation, a baby carrier can be a compact tool that assists a user in carrying and transporting a baby, while reducing the physical burden on the user while doing so. Further, a baby carrier can enable a user to position a baby relative to herself at a convenient location with minimal physical effort. Further still, when the baby carrier is not in use, it can be quickly stowed for storage or transport.

In an aspect, a baby carrier includes an enclosure, a seat configured to receive a baby, a back frame, and a first support frame. The first support frame includes an extendable arm having a handle, a first hinged leg, and a first wheel mounted to the first leg. The baby carrier is configured to reversibly transition between at least a stowed mode, a stroller mode, and a carrier mode. In the stowed mode of the baby carrier, the first leg is positioned at a first angle relative to the back frame, the extendable arm has a first length, and the enclosure encloses at least a portion of the seat, the back frame, and the first support frame. In the stroller mode of the baby carrier, the first leg is positioned at a second angle relative to the back frame, the second angle greater than the first angle, the extendable arm has a second length greater than the first length, and the seat is exposed, at least in part, by the enclosure. In the carrier mode of the baby carrier, the leg is positioned at the first angle relative to the back frame, the extendable arm has the first length, and the seat is exposed, at least in part, by the enclosure.

Implementations of this aspect can include one or more of the following features.

In some implementations, the baby carrier can further include a second support frame. In the carrier mode of the baby carrier, the second support frame can be coupled to the seat, and can extend in a direction away from the seat. The second support frame can be configured to support the baby carrier vertically from the ground.

In some implementations, the extendable arm can be configured to pivot with respect to the back frame.

In some implementations, in the stroller mode of the baby carrier, the extendable arm can be positioned parallel to the back frame and extends along a length of the back frame in a first direction. In the carrier mode of the baby carrier, the extendable arm can extend away from the back frame in a second direction opposite the first direction.

In some implementations, the baby carrier can further include a second hinged leg and a second wheel mounted to the second leg. In the stowed mode of the baby carrier, the second leg can be positioned at the first angle relative to the back frame. In the stroller mode of the baby carrier, the second leg can be positioned at the second angle relative to the back frame.

In some implementations, the baby carrier can further include a baby support harness configured to secure the baby to the seat.

In some implementations, the baby carrier can further include a user support harness configured to secure a user to the baby carrier, the user being different than the baby.

In some implementations, in the stowed mode of the baby carrier, the baby carrier can entirely enclose at least the seat.

In some implementations, the extendable arm can be configured to extend in a first direction away from the back frame. When the first leg is positioned at the second angle relative to the back board, the first leg can extend in a second direction away from the back board, the second direction being opposite the first direction.

In some implementations, the second support frame can be adjustable in length.

In some implementations, the second support frame can include a monopod leg.

In some implementations, the second support frame can include three support legs.

In some implementations, the second support frame can include an additional wheel mounted to each support leg of the support frame.

In some implementations, the second support frame can be reversibly detachable from the seat.

In some implementations, the seat can be foldable.

The details of one or more embodiments are set forth in the accompanying drawings and the description below. Other features and advantages will be apparent from the description and drawings, and from the claims.

DESCRIPTION OF DRAWINGS

FIGS. 8A-8F, 9A, 9B, and 10A-10D are diagrams of another example baby carrier.

DETAILED DESCRIPTION

Figure 1:
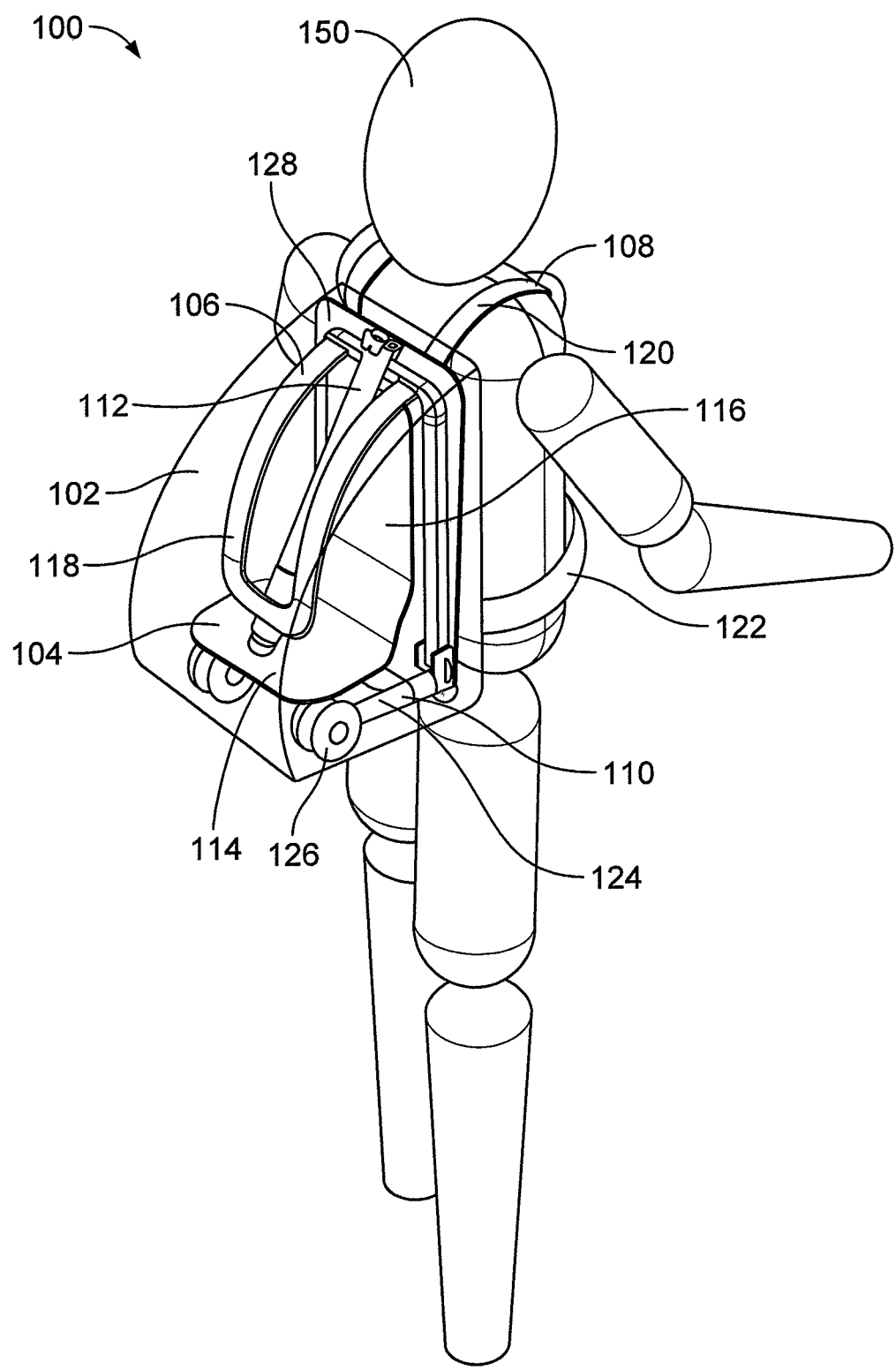
FIG. 1 is a diagram of an example baby carrier in a stowed mode.

Various implementations of a baby carrier are described herein. In an example implementation, a baby carrier can be a compact tool that assists a user in carrying and transporting a baby, while reducing the physical burden on the user while doing so. Further, a baby carrier can enable a user to position a baby relative to herself at a convenient location (e.g., at eye level, at chest level, at waist level, or at some other position) with minimal physical effort. Further still, when the baby carrier is not in use, it can be quickly stowed for storage or transport.

Although the term "baby" is used herein, it is understood that the disclosed baby carriers are not limited solely to carrying babies. In practice, the baby carriers described herein can carry babies, toddlers, animals, and/or other such individuals. In some case, the baby carriers described herein can further be used to carry inanimate objects, such as cameras, computers, or other objects.

Implementations of the baby carrier include various beneficial features. For instance, the baby carrier can be configured to support the weight of a baby through a support harness having one or more shoulder straps. As an example, a user can place the baby carrier on her back, and secure the shoulder straps around her shoulders. Further, the user can place the baby within the baby carrier. Accordingly, the baby is secured to the user's back, while the weight of the baby is supported, at least in part, by the user's shoulders. This relieves or lessens the physical burden on the user's arms, and thus, may increase the overall comfort of the user.

The baby carrier need not be positioned on the user's back. For example, a user can place the baby carrier on her chest, and secure the shoulder straps around her shoulders. Further, the user can place the baby within the baby carrier. Accordingly, the baby is secured to the user's chest, while the weight of the baby is supported, at least in part, by the user's shoulders. Similarly, this relieves or lessens the physical burden on the user's arms, and thus, may increase the overall comfort of the user. Further still, this enables the user to see the baby directly.

In some cases, the baby carrier can be configured to distribute the weight of the baby, at least in part, onto the user' shoulders, waist, and/or back. For example, the baby carrier can include various shoulder straps, waistbands, or other support structures to facilitate the distribution of weight throughout a user's body.

In some cases, the baby carrier can include a support frame that physically supports the baby carrier above the ground. For example, the baby carrier can include one or more support legs that, when deployed, contact the ground, and prop the baby carrier above the ground. This can be useful, for example, as it can further reduce the physical burden of carrying or transporting the baby (e.g., by off-loading at least some of the weight of the baby from the user's shoulders and onto the support frame).

In some cases, the baby carrier can be operated according to multiple different modes (e.g., transformed between different physical configurations) to accommodate the needs of a user. For instance, the baby carrier can be operated according to a carrier mode. In this mode, the baby carrier is physically configured to assist a user in carrying a baby. As an example, in the carrier mode, the user can place the baby carrier on her back on her chest (e.g., using the shoulder straps). As another example, in the carrier mode, the baby carrier can provide a seat or bench for supporting the baby. As another example, in the carrier mode, the baby carrier can provide a support harness for securing the baby of the seat or bench. As another example, in the carrier mode, the baby carrier can provide a support frame for supporting the baby carrier and the baby above the ground. In an example usage, the user can place the baby carrier on her chest, secure the baby carrier to her body using the shoulder straps, place the baby on the seat or bench of the baby carrier, and secure the baby to the baby carrier using a baby support harness. Accordingly, the baby's weight is support by the user's shoulders and/or by the support frame.

Further, the baby carrier can be operated according to a stroller mode. In this mode, the baby carrier is physically configured to assist a user in transporting a baby across a distance. As an example, in the stroller mode, the baby carrier can provide wheels for supporting the baby carrier and the baby above the ground. Further, the wheels enable the baby carrier to smoothly travel along the ground (e.g., when the baby carrier or pushed or pulled by the user). In an example usage, the user can place the baby on a seat or bench of the baby carrier, and secure the baby to the baby carrier using a baby support harness. In this position, the baby is closer to the ground (e.g., compared to the carrier mode), which may provide increased stability and safety. Further, the user can extend a handle, and use the handle to push or pull the baby carrier along the ground to transport the baby carrier and the baby.

Further, the baby carrier can be operated according to a stowed mode. In this mode, the baby carrier is physically configured to facilitate storage and transport of the baby carrier (e.g., while the baby carrier is not being used to carry or transport a baby). As an example, in the stowed mode, the baby carrier can retract the seat or the bench into a storage position (e.g., to reduce the physical size of the baby carrier or to make the baby carrier less unwieldy) and/or some or all of the components of the baby carrier in an enclosure (e.g., to protect the components of the baby carrier from the elements). As another example, in the stowed mode, the baby carrier can retract or disconnect the support frame to further facilitate storage or transport. As another example, in the carrier mode, the baby carrier can retract the wheels into a storage position (e.g., to further reduce the physical size of the baby carrier or to further make the baby carrier less unwieldy).

A user can interact with the baby carrier to selectively transform the baby carrier between these modes. For example, a user can initially obtain the baby carrier in a stowed mode (e.g., with the seat or bench retracted or enclosed in an enclosure, the support frame retracted or detached, and the wheels retracted). If the user wishes to carry a baby, the user can interact with the baby carrier to deploy the seat or bench, and deploy or attach the support frame. Further, the user can place the baby carrier or her back or chest, and secure the baby into the baby carrier (e.g., using the support harness). If the user wishes to transport the baby, the user can interact with the baby carrier deploy the wheels (and if needed, retract or disconnect the support frame). Further, the user can place the baby carrier on the ground (e.g., with its wheels facing the ground), place the baby into the baby carrier (e.g., using the baby support harness), and push or pull the baby carrier along the ground. If the user wishes to stow the baby carrier, the user can retract the seat or bench and/or enclose the seat or bench in an enclosure, and retract the wheels. Accordingly, the baby carrier can be physically transformed in a variety of different ways, depending on the user's needs.

An example baby carrier 100 is shown in FIG. 1. For clarity, the baby carrier 100 is depicted as a transparent wireframe, such that components and structures within the baby carrier 100 can be more readily seen. However, in practice, each of the components of the baby carrier 100 can be constructed of transparent, translucent, or opaque material, depending on the implementation.

As shown in FIG. 1, the baby carrier 100 includes an enclosure 102, a baby seat 104, a baby support harness 106, a user support harness 108, a stroller support frame 110, a monopod support frame 112, and a back frame 128. In the configuration shown in FIG. 1, the baby carrier 100 is in a "stowed" mode for facilitating transport of the baby carrier 100 (e.g., while a baby is not being carried or transported using the baby carrier 100).

The enclosure 102 encloses one or more of the components of the baby carrier 100. For example, as shown in FIG. 1, the enclosure can enclose the baby seat 104, the baby support harness 106, the stroller support frame 110, and/or the monopod support frame 112. This can be useful, for example, protect the components of the baby carrier 100 during use and storage. Further, this can be useful to improve the appearance of the baby carrier 100 (e.g., by hiding one or more components from view). In some cases, the enclosure 102 can be constructed from a soft material (e.g., fabric, leather, flexible plastic, and so forth). In some cases, the enclosure 102 can be constructed from a hard material (e.g., hard plastic, metal, wood, and so forth). In some cases, the enclosure 102 can include one or more reversible fastening mechanisms (e.g., zipper, buttons, pins, clasps, and so forth) that enable a user to selectively open or remove the enclosure 102 (e.g., to reveal the components with the enclosure 102) and close the enclosure 102 (e.g., to hide and/or protect the components within the enclosure 102). In some cases, the enclosure 102 can be folded and stored behind the baby seat 104 when it is not in use.

The baby seat 104 provides a seating surface for a baby. For example, as shown in FIG. 1, the baby seat 104 can include a base portion 114 (e.g., for supporting a baby's posterior), and a vertical portion 116 (e.g., for supporting a baby's back or front). The baby seat 104 can be made of various materials. For example, in some cases, some or all of the baby seat 104 can be made from a rigid material (e.g., hard plastic, metal, wood, and so forth). In some cases, some or all of the baby seat 104 can be made from a soft material (e.g., fabric, leather, flexible plastic, rubber, silicone, or other material). In some cases, the baby seat 104 can include a cushioning material (e.g., foam, rubber, feathers, etc.) to improve the comfort of the baby as he sits on the baby seat 104 (e.g., by providing back or hip support).

The baby support harness 106 enables a baby to be securely positioned to the baby seat 104. For example, as shown in FIG. 1, the baby support harness 106 can include one or more shoulder straps 118 configured to drape over and around a baby's shoulders as he sits on the seat 104, such that the baby is securely positioned between the vertical portion 116 and the shoulder straps 118. In some cases, the baby support harness 106 can also include a waistband configured to encircle the waist of the baby (e.g., to provide additional support).

The user support harness 108 enables a user to securely position the baby carrier 100 against her body. For example, as shown in FIG. 1, the user support harness 108 can include one or more shoulder straps 120 and/or waistbands 122. A user 200 can place the baby carrier 100 on her back, and position the shoulder straps 120 such that they drape over and around her shoulders. Further, the user can position the waistband 122 such that it encircles her waist. Thus, the baby carrier 100 can be securely positioned against the back of the user 150. The use support harness 108 can be adjustable in length, and can be constructed from a breathable, durable, and comfortable material.

The stroller support frame 110 enables the baby carrier 100 to operate according to a stroller mode. The stroller support frame 100 includes support legs 124, and wheels 126. As shown in FIG. 1, when the baby carrier 100 is in the stowed mode, the support legs 124 and wheels 126 are in a retracted position within the enclosure 102. However, the support legs 124 and the wheels 126 can be extended from the enclosure 102 to accommodate the needs of the user (e.g., in a stroller mode). The stroller mode is discussed in greater detail below.

The monopod support frame 112 enables the baby carrier 100 to operate according to a carrier mode. The monopod support frame 112 can be reversibly attached and detached from baby carrier 100. For example, as shown in FIG. 1, when the baby carrier 100 is in the stowed mode, the monopod support frame 112 can be detached from the other components of the baby carrier 100 and stowed (e.g., within the enclosure 102). However, the monopod support frame 112 can be attached to the baby carrier 100 to accommodate the needs of the user (e.g., in a carrier mode). The carrier mode is discussed in greater detail below.

The back frame 128 is positioned behind the stroller support frame 110. In some cases, the back frame 128 can be a rigid sheet, board, or plank (e.g., a sheet, board, or plank of rigid plastic, metal, wood, and/or some other rigid material), and provides structural support for the baby carrier 100. In some cases, the back frame 128 can include one or more rigid beams, bars, arms, or slats. In some cases, some or all of the components of the baby carrier 100 can be securely mounted to the back frame 128 to provide structure stability.

As shown in FIG. 1, in a stowed mode, the baby carrier 100 enables a user 150 to conveniently carry the baby carrier 100 on her back. Further, as many of the components of the baby carrier 100 are secured within the enclosure 102 (e.g., the baby seat 104, the baby support harness 106, the stroller support frame 110, and/or the monopod support frame 112), the physical dimensions of the baby carrier 100 are reduced and/or the baby carrier 100 is less unwieldy to handle. Further still, the components of the baby carrier 100 are protected from the elements.

The baby carrier 100 can be transformed to assist the user in carrying a baby. For instance, in the configuration shown in FIG. 2A, the baby carrier 100 is in a "carrying" mode. In an example usage, the user 150 opens or removes the enclosure 102 to reveal or expose at least some of the components of the baby carrier 100 within it. The user 150 places a baby 200 on the seat 104, and uses the baby support harness 106 to secure the baby 200 to the seat 104 (e.g., by positioning the shoulder straps 118 such that they drape over and around the shoulders of baby 200). In some cases, the baby carrier 100 can also include additional back and/or head support panels to further secure the baby in the seat 104 (for ease of illustration, only a portion of the seat 104 is shown). Further, the user 150 uses the user support harness 108 to secure the baby carrier 100 to her body (e.g., by positioning the shoulder straps 120 such that they drape over and around her shoulders and/or by positioning the waistband 122 such that it encircles her waist). In this configuration, the baby carrier 100 offloads at least a portion of the weight of the baby 200 to the shoulders of the user 150. Accordingly, the physical burden on the hands of the user 150 are reduced or eliminated. In some cases, this enables the user 150 to perform other activities with her hands while the baby 200 is supported against her body. Nevertheless, the user 150 can also keep one or both of her hands on the baby 200 (e.g., to provide additional security or stability).

Further, the user 200 can also deploy the monopod support frame 112 to offload at least some of the weight of the baby 200 from the user. For example, as shown FIG. 2A, the monopod support frame 112 can be attached to the bottom of the baby carrier 100 (e.g., the bottom of the baby seat 104). The monopod support frame 112 can be attached, for example, using a screw mechanism, a slot mechanism, or some other coupling mechanism. When attached, the monopod support frame 112 projects away from the baby carrier 100. Accordingly, the user can position the end 202 of the monopod support frame 112 on the ground, such that the baby carrier 100 is propped up by the monopod support frame 112. The end 202 can be, for example, a "non-slip tip" (e.g., a rubber tip, a spike, etc.) to reduce the likelihood that the end 202 moves along the ground during use. In this configuration, the baby carrier 100 offloads some or all of the weight of the baby 200 to the ground via the support frame 112, thereby relieving the user 200 of physical burden on her body. This can be useful, for example, if the baby 150 is too heavy to comfortably carry with using the user support harness 108 alone (e.g., without the monopod support frame 112). In some cases, the support frame 112 can offload approximately 90% to 100% of the weight of the baby 200 from the user 200. Further, in a similar manner as described above, this configuration enables the user 150 to perform other activities with her hands while the baby 200 is supported by the monopod support frame 112. Nevertheless, the user 150 can also keep one or both of her hands on the baby 200 (e.g., to provide additional security or stability).

Figure 2A:
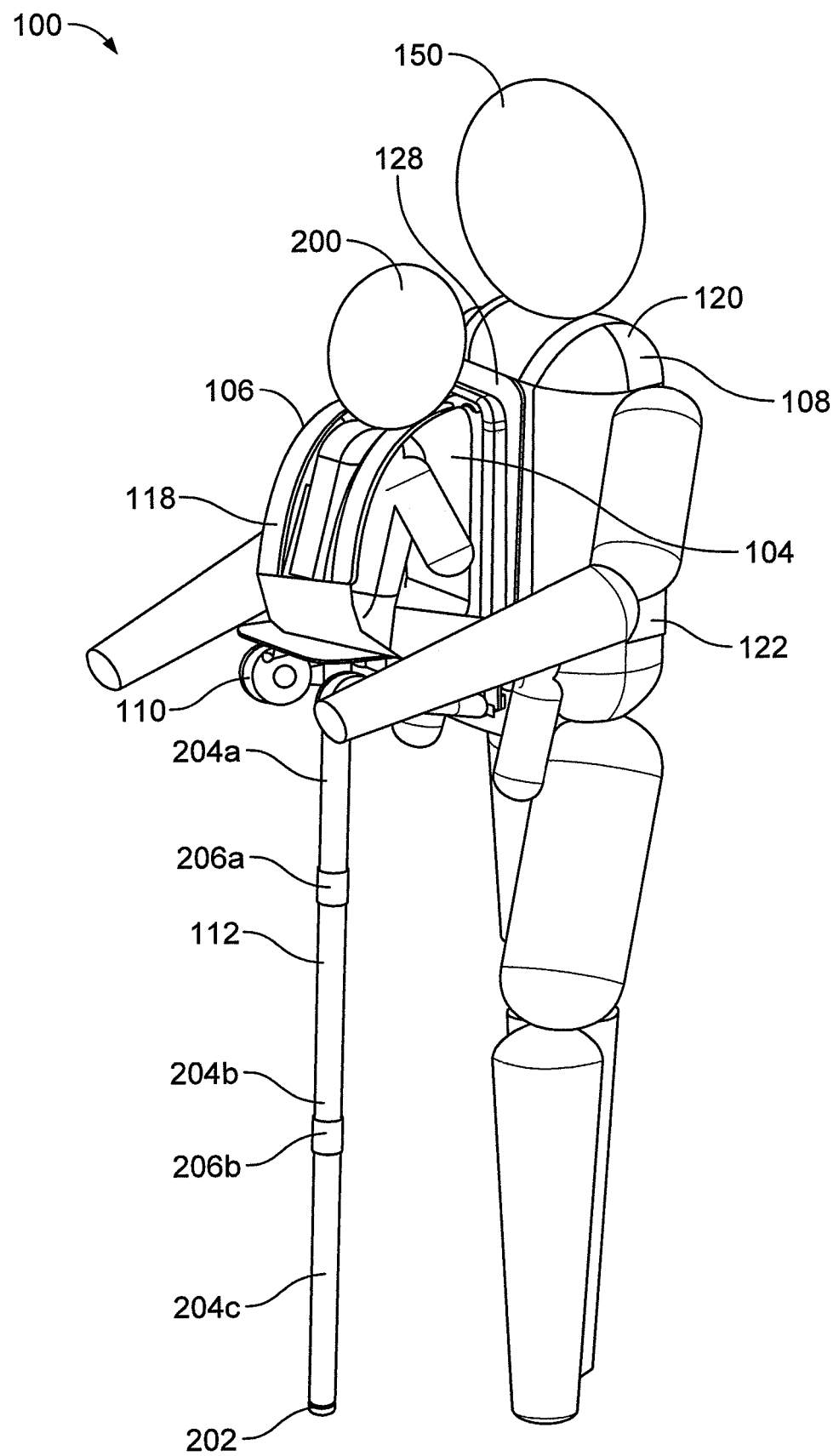
FIGS. 2A and 2B are diagrams of the baby carrier of FIG. 1 in a carrier mode.

The length of the monopod support frame 112 can be adjustable. For example, as shown in FIG. 2A, the monopod support frame 112 can include multiple telescoping legs 204a-c, coupled together through telescoping controls 206a and 206b (e.g., adjustable sleeves or clamps). A user can operate the telescoping controls 206a and 206b (e.g., by loosening or unclamping the telescoping controls 206a and 206b) such that the telescoping legs 204a-c can move relative to other another. Accordingly, the length of the monopod support frame 112 can be adjusted. When the user is satisfied with the height of the monopod support frame 112, the user can operate the telescoping controls 206a and 206b (e.g., by tightening or clamping the telescoping controls 206a and 206b) such that the telescoping legs 204a-c are secured or locked relative to one another. Accordingly, the monopod support frame 112 can be used to rigidly support the weight of the baby 150. In some cases, the length of the monopod support frame 112 can be adjusted in a range from 40 inches to 48 inches. This adjustable height range can be particularly useful, for example, as it enables a user having a height between five feet or six feet to comfortably position a baby relative to her body (e.g., such that the baby is positioned at waist level, chest level, or some other convenient position). In some cases, the length of the monopod support frame 112 can be adjusted such that when the end 202 is positioned against the ground, the baby seat 104 is positioned at eye level to the user 200, at the waist of the user 200, at the chest of the user 200, or at some other position with respect to the user 200.

Further, as shown in FIG. 2A, the components of the stroller support frame 110 (e.g., the support legs 124 and the wheels 126) are in a retracted position (e.g., folded against the baby carrier 100). This can be useful, for example, to reduce the physical size of the baby carrier or to make the baby carrier less unwieldy when the stroller support frame 110 is not in use.

In the example shown in FIG. 2A, the baby 200 is positioned such that he is facing the user 150. This can be useful, for example, as it enables face to face interaction between the user 150 and the baby 200. In some cases, this can be particularly beneficial in situations when the baby 150 needs to be held for an extended period of time (e.g., when baby is tired and crying), as the baby 150 is falling asleep, or when the baby 150 and the user 200 are waiting in a queue (e.g., in an amusement park).

Figure 2B:
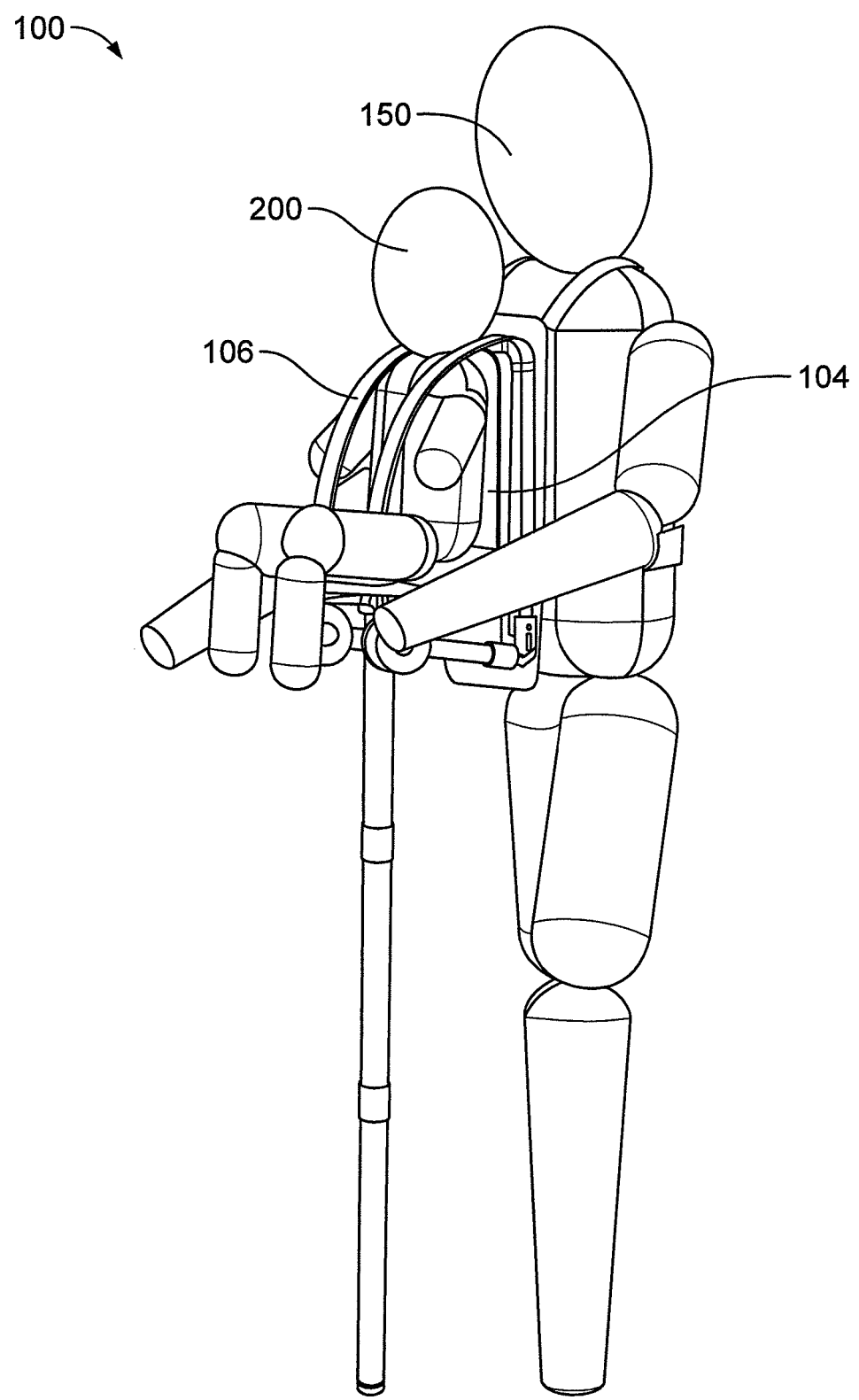

In some cases, the baby carrier 100 can be used the position the baby 150 such that he faces away from the user 200. This can be useful, for example, as it enables the baby 150 to observe and interact with the environment around him (e.g., observe an interact with people other than the user 200, observe and interact with exhibits and objects, and so forth). As an example, as shown in FIG. 2B, the baby 200 can be positioned on the baby seat 104 such that he is facing away from the user 150, and secured to the baby seat 104 using baby support harness 106.

Figure 3:
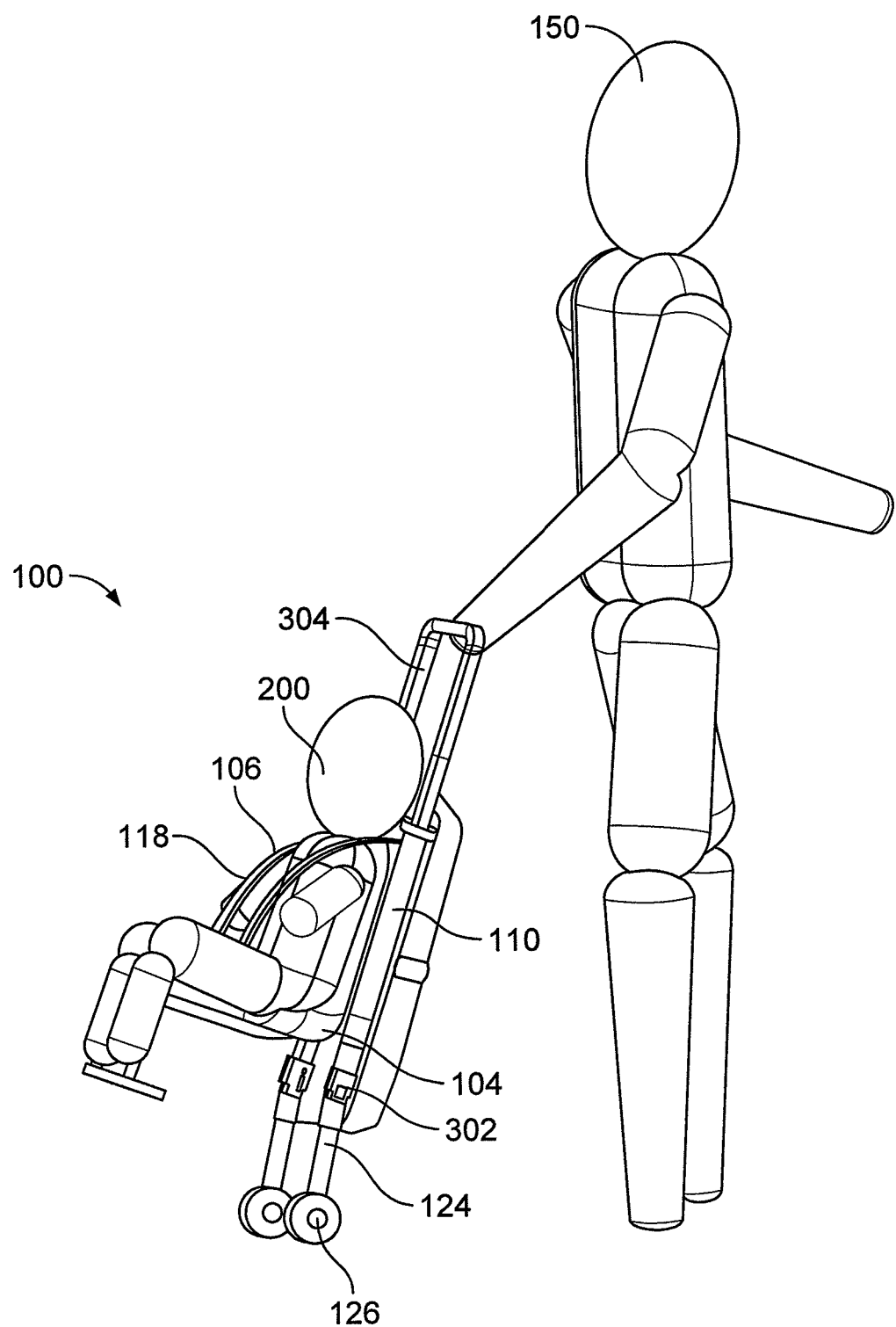
FIG. 3 is a diagram of the baby carrier in FIG. 1 in a stroller mode.

The baby carrier 100 also can be transformed to assist the user in transporting a baby. For instance, in the configuration shown in FIG. 3, the baby carrier 100 is in a "stroller" mode. In an example usage, the user 150 opens or removes the enclosure 102 to reveal the components of the baby carrier 100 within it. The user 150 places a baby 200 on the seat 104, and uses the baby support harness 106 to secure the baby 200 to the seat 104 (e.g., by positioning the shoulder straps 118 such that they drape over and around the shoulders of baby 200). Further, the user 150 deploys the stroller support frame 110. For example, the user 200 can unfold the support legs 124 from the baby carrier 100 (e.g., via hinges 302), such that the wheels 126 extend away from the baby carrier 100. In some cases, the deploying the support legs 124 and wheels 126 can include increasing an angle between the support legs 124 and the back frame 128 (e.g., from about 90° to about 180°).

Further, the user 200 can extend a stroller handle 304 from the stroller frame 110. The stroller handle 302 can be, for example, a bar or hand grip that telescopes into and out of the stroller frame 110. Using the stroller handle 302, the user 200 can push or pull the baby carrier 100 such that the baby carrier 100 smoothly rolls on the ground via the wheels 126. The height of the stroller handle 302 can be adjusted between multiple different positions to accommodate the dimensions and/or preferences of the user 150. For example, in some cases, the stroller handle 302 can be extended a relatively smaller amount from the stroller frame 100 (e.g., if the dimensions and/or the preferences of the user makes it more comfortable for her to grasp the stroller handle 302 when it is closer to the ground). As another example, in some cases, the stroller handle 302 can be extended a relatively larger amount from the stroller frame 100 (e.g., if the dimensions and/or the preferences of the user makes it more comfortable for her to grasp the stroller handle 302 when it is further from the ground).

Figure 4A:
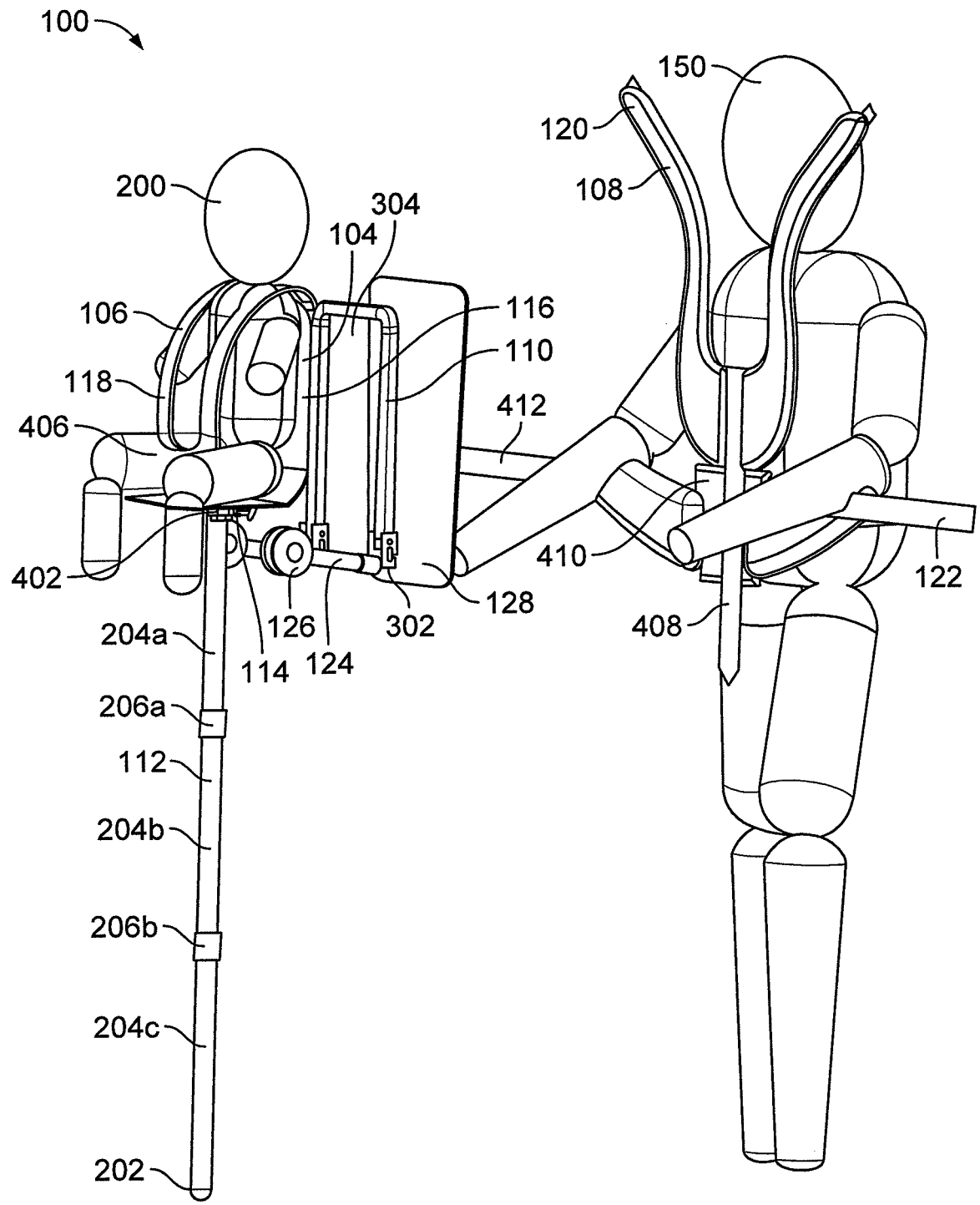
FIGS. 4A and 4B are layered diagrams of the baby carrier of FIG. 1.

FIG. 4A shows a layered view of the baby carrier 100. For ease of illustration, the enclosure 102 is not shown.

As shown in FIG. 4A, the baby carrier includes an attachment mechanism 402 for attaching the monopod support frame 112 to the baby seat 104. The attachment mechanism 402 can be, for example, a screw mechanism, a slot mechanism, or some other coupling mechanism.

Further, as shown in FIG. 4A, the baby carrier 100 can includes a back frame 128 positioned behind the stroller support frame 110 for provides structural support for the baby carrier 100.

Further, as shown in FIG. 4A, the shoulder straps 118 of the baby harness 106 can converge into a single strap 406. The strap 406 can be secured between the baby's legs (e.g., using a buckle or snap positioned on the baby seat 104).

Further, as shown in FIG. 4A, the shoulder straps 120 of the user harness 108 also can converge into a single strap 408. The strap 408 can be secured to the waistband 122. For example, the user harness 108 can include a patch portion 410, to which the strap 408 and the waistband 122 are securely fastened (e.g., using an adhesive, through sewing, through bonding, or other attachment mechanism). Further, the strap 408 can be positioned by the user 150 such that it extends downwards to enable secure attachment to the enclosure 102 and the back frame 128, and extends back up along the user's posterior, and fastened to the waistband 112 along the user's back (e.g., using a buckle, a button, etc.) to form a more secure harness.

The patch portion 410 also can be used to secure the user harness 108 to the back frame 128 and/or the enclosure 102. For example, the user harness 108 can include a strap 412 that extends from the patch portion 408 to the back frame 128 and/or the enclosure 102. The strap 410 can be secured fastened to the patch portion 408, the back frame 128, and/or the enclosure 102 using an adhesive, through sewing, through bonding, or using other attachment mechanisms. This can be useful, for example, as enables the user 150 to secure the baby carrier 100 to her body, thereby reducing the likelihood that the baby carrier 100 and the baby 200 will fall.

Figure 4B:
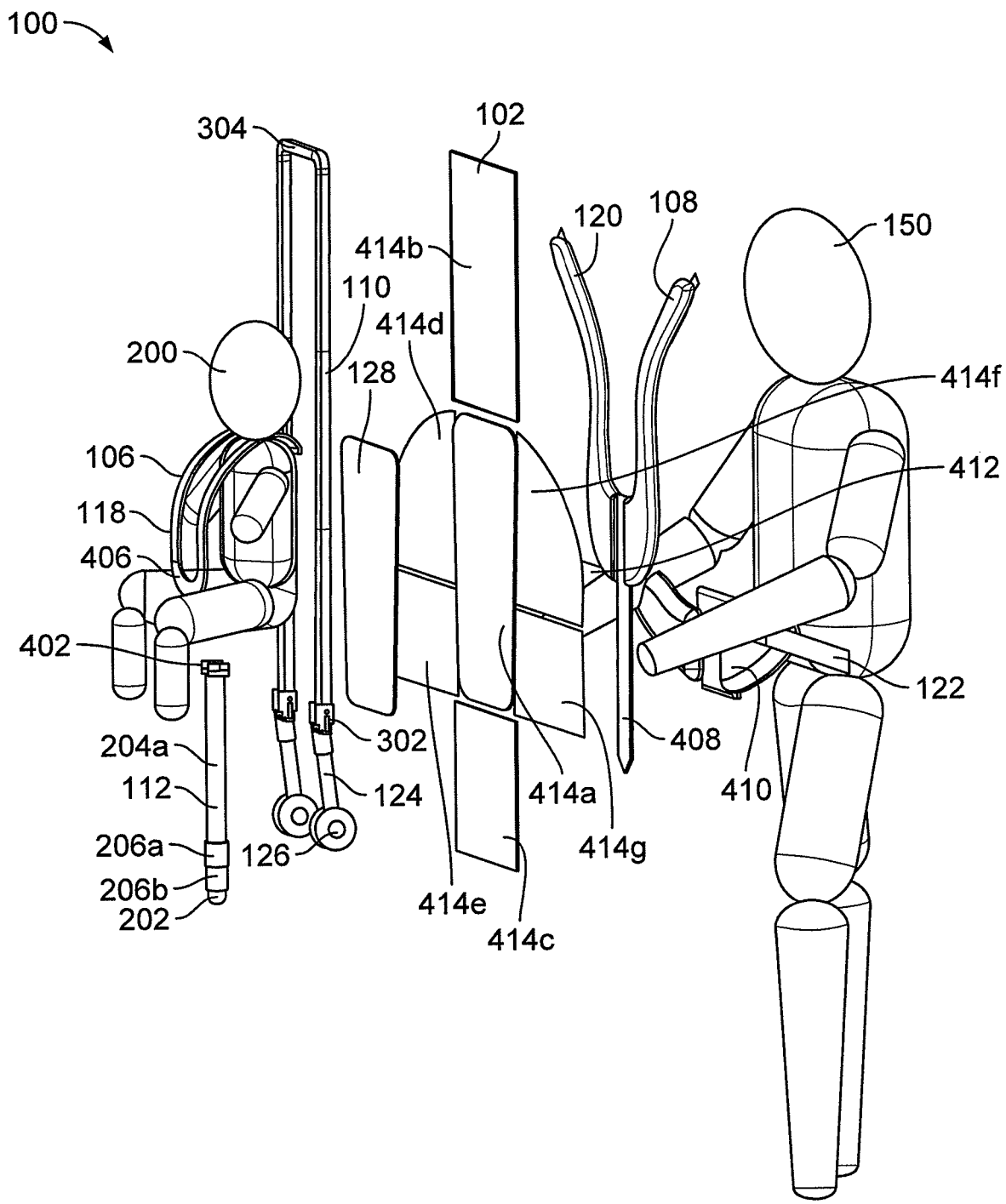

FIG. 4B shows another layered view of the baby carrier 100, including the enclosure 102. For ease of illustration, the baby seat 104 is not shown.

In this example, the monopod support frame 112 is detached from the rest of the baby carrier 100. The monopod support frame 112 is also in a retracted configuration (e.g., with the telescoping legs 204a-c nested together). This can be useful, for example, as it enables a user to more conveniently store the monopod support frame 112 when it is not in use.

As shown in FIG. 4B, the enclosure 102 can include multiple panels 414a-g that are attached to one another (e.g., through an adhesive, through sewing, through bonding, or using other attachment mechanisms). For ease of illustration, the panels 414a-g are shown in a flat or layered view, and in an unfolded configuration. In some cases, the panels 414a-g can be constructed from a light weight, durable and flexible material, such as CORDURA fabric (produced by Invista, Wichita, Kans.). The back panel 414a and the front panel 414b enclose the back frame 128 (e.g., when the panels 414a and 414b are folded and fastened against each other with the back frame 128 positioned between them). The bottom panel 414c encloses the bottom of the baby carrier 100 (e.g., when the baby carrier 100 is in the stowed mode). Further, the bottom panel 414c can be folded back and secured behind the back frame 128 by the user to reveal the stroller frame 110 (e.g., when the baby carrier 100 is in the stroller mode). Similarly, the panels 414d-g also can be folded back and secured behind the back frame 128 by the user to reveal the baby seat 104 and/or the stroller frame 110 (e.g., when the baby carrier 100 is in the carrier mode or the stroller mode). This can be useful, for example, as it enables a user to quickly and convenient store the panels 414a-g when the enclosure 102 is opened.

Figure 5A:
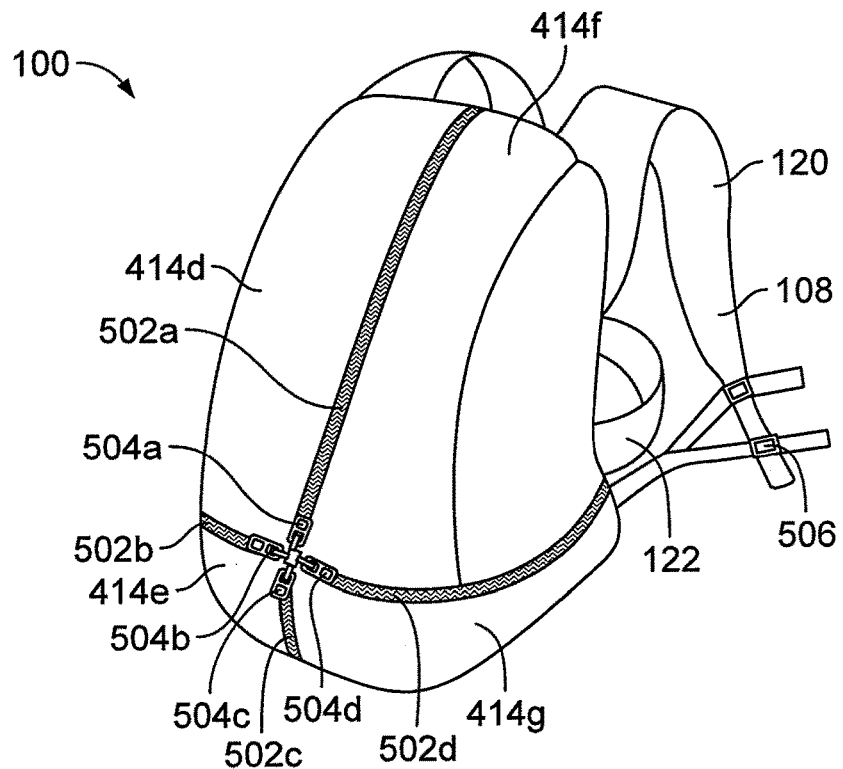
FIGS. 5A and 5B are diagrams of example baby carriers.

FIG. 5A shows a front view of the baby carrier 100 in a stowed mode, with the user support harness 108 positioned towards the back of the baby carrier 100. At least some of the panels 414a-g can be reversibly fastened to each other to facilitate opening and closing the enclosure 102. For example, as shown in FIG. 5A, the panels 414d and 414f are reversibly attached to each other through zippered edges 502a and a zipper 504a. Further, the panels 414d and 414e are reversibly attached to each other through zippered edges 502b and a zipper 504b. Further, the panels 514e and 514g are reversibly attached to each other through zippered edges 502c and a zipper 504c. Further, the panels 414f and 414g are reversibly attached to each other through zippered edges 502d and a zipper 504d. To open the enclosure 102, a user can unzip each of the zippered edges 502a-d, and secure the panels behind the back frame 128.

Figure 5B:
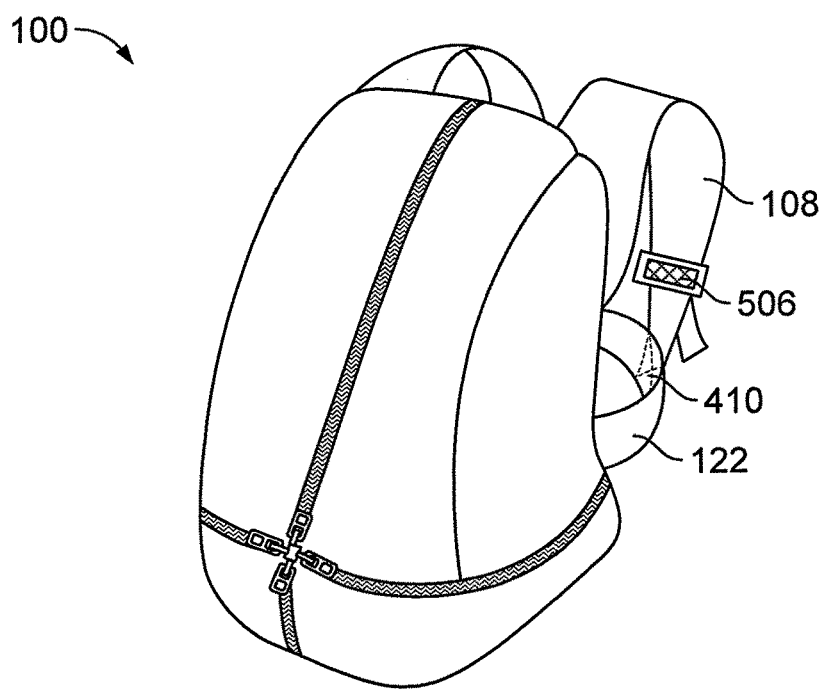

The user support harness 108 can be adjusted to suit the dimensions and/or the preferences of the user 150. For example, as shown in FIG. 5A, the shoulder straps 120 of the user support harness 108 can include length adjustment clips 506 to extend or retract the length of the shoulder straps 120. In this example, the shoulder straps of the user support harness 108 are not directly connected to the waistband, and are instead provided as two separate components. As another example, as shown in FIG. 5B, the shoulder straps 120 of the user support harness 108 can be fastened to the waistband 122 through a patch portion 410. Similarly, the user support harness 108 can include length adjustment clips 506 to extend or retract the length of the shoulder straps 120. In this example, the shoulder straps of the user support harness 108 are directly connected to the waistband, and provide a single interconnected harness.

Figure 6B:
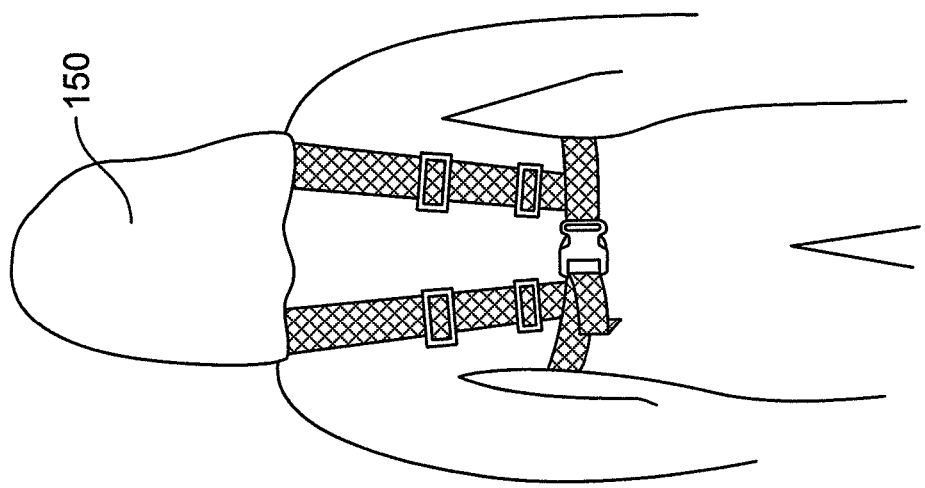
FIGS. 6A and 6B are diagrams of example user support harnesses.
Figure 6A:
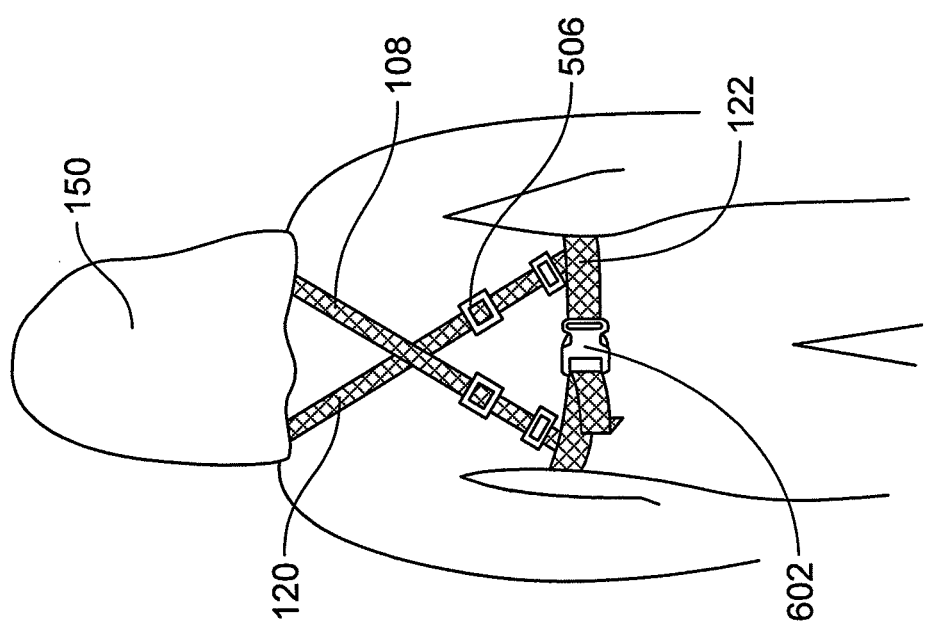

FIGS. 6A and 6B show example implementations of the user support harness 108. In the examples shown in FIGS. 6A and 6B, the user support harness 108 both shoulder straps 108 securely fastened to the waistband 122. Further, the user support harness 108 includes length adjustment clips 506 for extending or retracting the length of the shoulder straps 120. Further, the user support harness 108 includes a buckle 602 for fastening the ends of the waistband 122 together (e.g., behind the user 150) and/or adjusting the length of the waistband 122. In some implementations, the shoulder straps 108 can be configured to such that they cross over each other (e.g., in a "crossed" style) when secured to the user 150 (e.g., as shown in FIG. 6A). In some implementations, the shoulder straps 108 can be configured to such that they do not cross over each other (e.g., in a "rucksack" style) when secured to the user 150 (e.g., as shown in FIG. 6B). In the rucksack style shown in FIG. 6B, the user support harness 108 can also include one or more additional belts and clips to further enhance the stability and safety of the baby carrier 100 (e.g., a front chest belt and clips to tie the left and right shoulder belts together when in use).

As shown in FIGS. 1, 2A, 2B, 4A, and 4B, a baby carrier 100 can include a monopod support frame 112 that enables the baby carrier 100 to operate according to a carrier mode (e.g., by propping up the baby carrier 100 from the ground). However, other types of support frame also can be used. For instance, in some cases, a multi-legged support frame can be used. A multi-legged support frame can be beneficial, for example, to provide additional stability to the baby carrier 100 in the carrier mode.

Figure 7A:
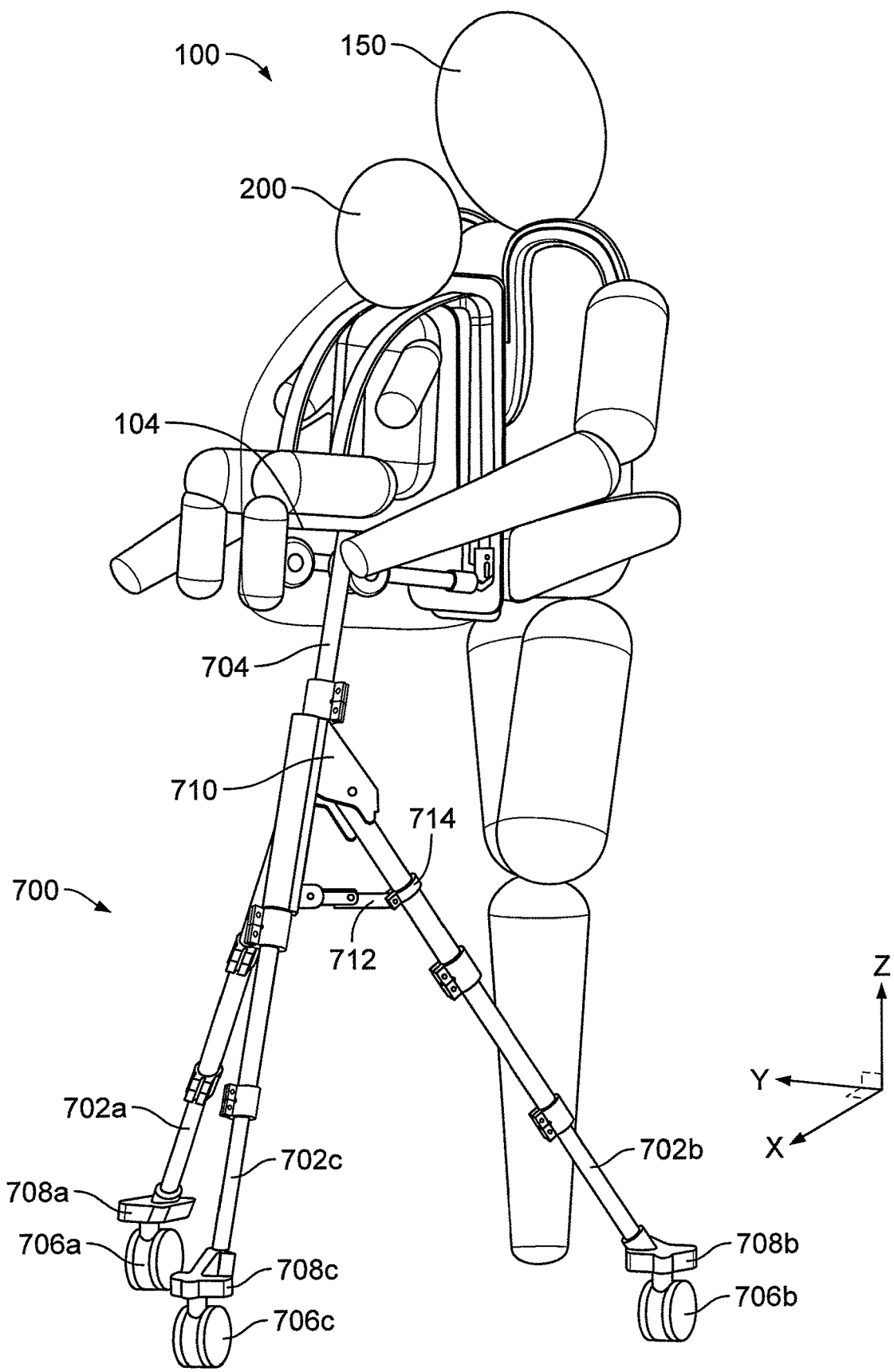
FIGS. 7A and 7C are diagrams of an example baby carrier having a multi-legged support frame.

As an example, FIG. 7A shows a baby carrier 100 having a multi-legged support frame 700. Further, the multi-legged support frame 700 is shown in a stowed configuration in FIG. 7B, and in a deployed configuration in FIGS. 7D and 7E. In some cases, the support frame 700 can be used instead of the monopod support frame 112. In some cases, the multi-legged support frame 700 can be used in conjunction with the monopod support frame 112. For instance, the monopod support frame 112 and the multi-legged support frame 700 both can be configured to reversibly attach to and detach from the rest of the baby carrier 100, such that they can be interchangeably used with the baby carrier 100. Thus, a user can selectively use the monopod support frame 112 in some circumstances (e.g., when the user wishes to use a more compact support frame), and the multi-legged support frame 700 in other circumstances (e.g., when the user wishes to use a support frame that provides a greater degree of stability).

The multi-legged support frame 700 can be attached to the bottom of the baby carrier 100 in a similar manner as the monopod support frame 112. For example, the multi-legged support frame 700 can be attached using a screw mechanism, a slot mechanism, or some other coupling mechanism. When attached, the multi-legged support frame 700 projects away from the baby carrier 100. Accordingly, the user can position the bottom of the multi-legged support frame 700 on the ground, such that the baby carrier 100 is propped up by the multi-legged support frame 700.

As shown in FIG. 7A, the multi-legged support frame 700 includes three legs 702a-c, and an arm 704. The three legs 702a-c and the arm 704 collectively form an unsymmetrical tripod frame. For example, each of the legs 702a-c extends in a diagonally downward direction to contact the ground, and the arm 704 extends upward to fasten to the baby seat 104. Further, the legs 702a-c are uneven length and asymmetrical in orientation. For example, the side legs 702a and 702b each can have the same length, while the front leg 702c can have a longer length than each off the side legs 702a and 702b. In this configuration, the angle of the front leg 702c with respect to the ground (e.g., a horizontal surface) is less than the angles of each of the side legs 702a and 702b with respect to the ground. Accordingly, the multi-legged support frame 700 asymmetrically slants towards the rear of the multi-legged support frame 700.

Further, as shown in FIG. 7A, the arm 704 extends parallel to the front leg 702c. Accordingly, it also extends diagonally and asymmetrically towards the rear of the device (e.g., rather than in a strictly vertical direction with respect to the ground).

This asymmetrical configuration enables the multi-legged support frame 700 to position the baby seat 104 closer to the user 150 (e.g., when the user 150 is positioned behind the baby carrier 100 and/or between the side legs 702a and 702b as shown in FIG. 7A). Further, this asymmetrical configuration places the legs 702a-c further away from the legs of the user 150. Accordingly, the user 150 can stand behind the multi-legged support frame 700 and/or between the side legs 702a and 702b, and position the baby 200 closer to her body (thereby increasing the safety of the baby 150) while freely walking without interference from the legs 70a-c.

The length of each of the legs 702a-c and the arm 704 are adjustable (e.g., in a similar manner as the monopod support frame 112). For example, the legs 702a-c and the arm 704 each can include telescoping structures that enable them to extend and retract in length (e.g., through use of telescoping controls, in a similar manner as described above).

The lengths of each of the legs 702a-c and arm 704 can vary, depending on the implementation. For example, in some cases, the leg 702c can have a length between 28 inches to 36 inches, the leg 702a can have a length between 32 inches and 40 inches, the leg 702b can have a length between 32 inches and 40 inches, the arm 704 can have a length between 1.5 inches and 13 inches. In some cases, the lengths of the legs can be adjusted, either within these ranges, or within some other range. In some cases, these lengths can be beneficial, as they enable the baby carrier to support the baby stably, and in a position that is comfortable to the adult. Although example lengths are described above, other lengths are also possible, depending on the implementation.

The angles between the legs also can vary, depending on the implementation. In some cases, the angles can be defined with respect to a Cartesian coordinate system.

The x-axis of the Cartesian coordinate system can refer to the linear direction representing forward and backward motion. In the example shown in FIG. 7A, the x-axis extends in the direction pointing from the user's foot to the front wheel 706c of the leg 702c. In the example shown in FIG. 7D, the x-axis extends from the right to the left. In the example shown in FIG. 7E, the x-axis extends out of the page.

The y-axis of the Cartesian coordinate system can refer to the linear direction representing sideway motion left and right, orthogonal to the x-axis. In the example shown in FIG. 7A, the y-axis extends in the direction pointing from the wheel 706b of the leg 702b to the wheel 706a to the leg 702a. In the example shown in FIG. 7D, the y-axis extends into the page. In the example shown in FIG. 7E, the y-axis extends from the right to the left.

The z-axis of the Cartesian coordinate system can refer to the linear direction representing vertical motion up and down, orthogonal to the x-axis and the y-axis. In the examples shown in FIGS. 7A, 7D, and 7E, the z-axis extends from the bottom to the top.

A pitch angle can represent the degree of "tilt" rotation forward and backward (e.g., rotation about the y-axis). A pitch angle can also represent the angle between the extension of a leg and the vertical direction (e.g., the z-axis), indicating the incline of the leg from the vertical direction along the x-z plane.

A yaw angle can represent the degree of left or right rotation in the horizontal plane (e.g., rotation about the z-axis).

A roll angle can represent the degree of tilt rotation left and right (e.g., rotation about the x-axis). A roll angle can also represent the angle between the extension of a leg and the vertical direction (e.g., the z-axis), indicating the incline of the leg from the vertical direction along the y-z plane.

Figure 7B:
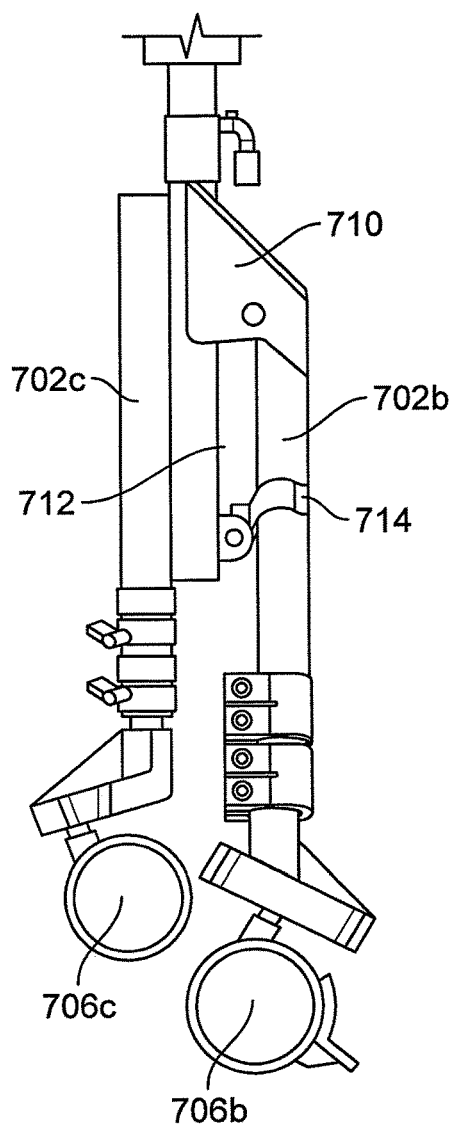
FIGS. 7B, 7D, and 7E show a multi-legged support frame.
Figure 7C:
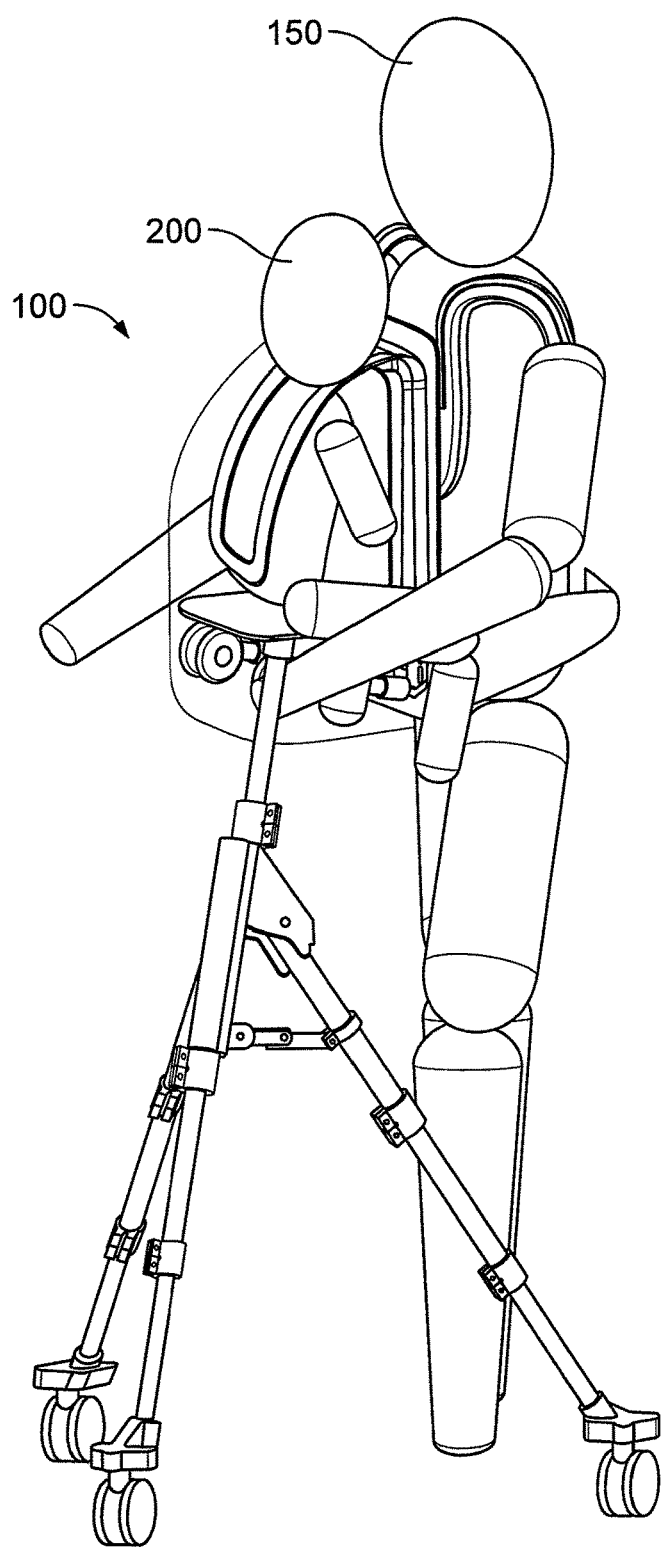
Figure 7D:
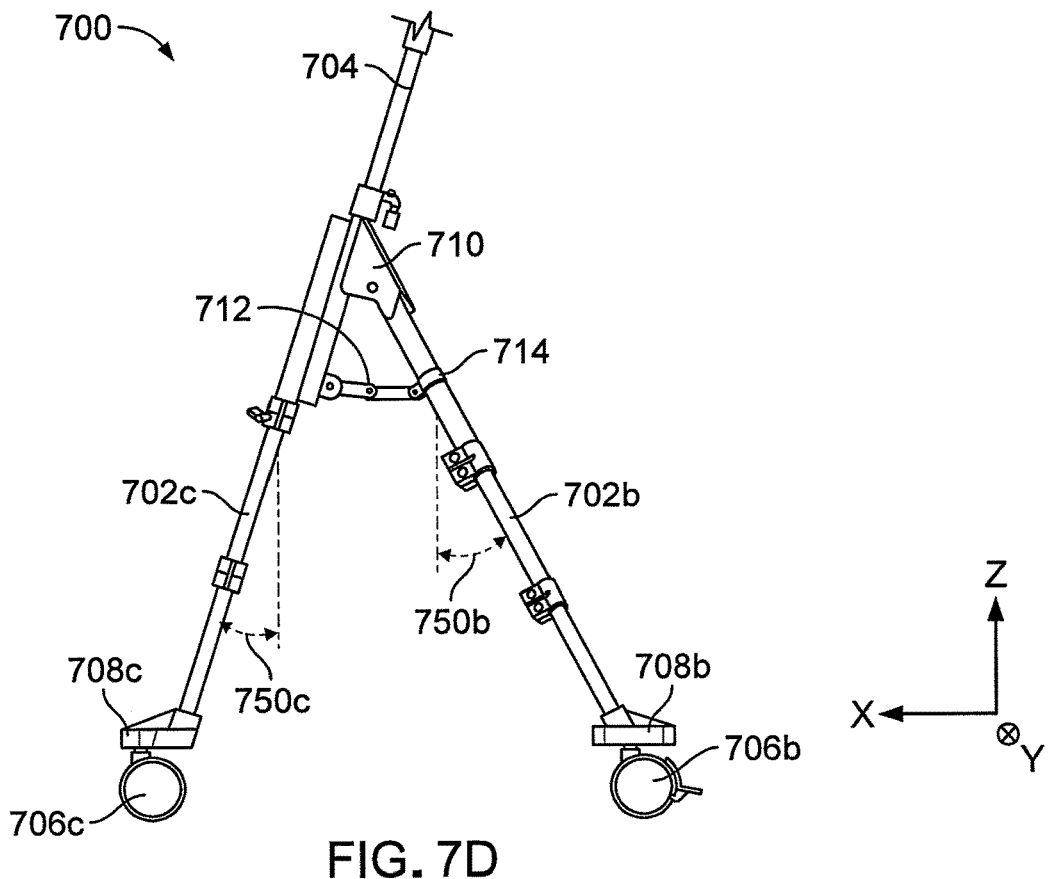
Figure 7E:
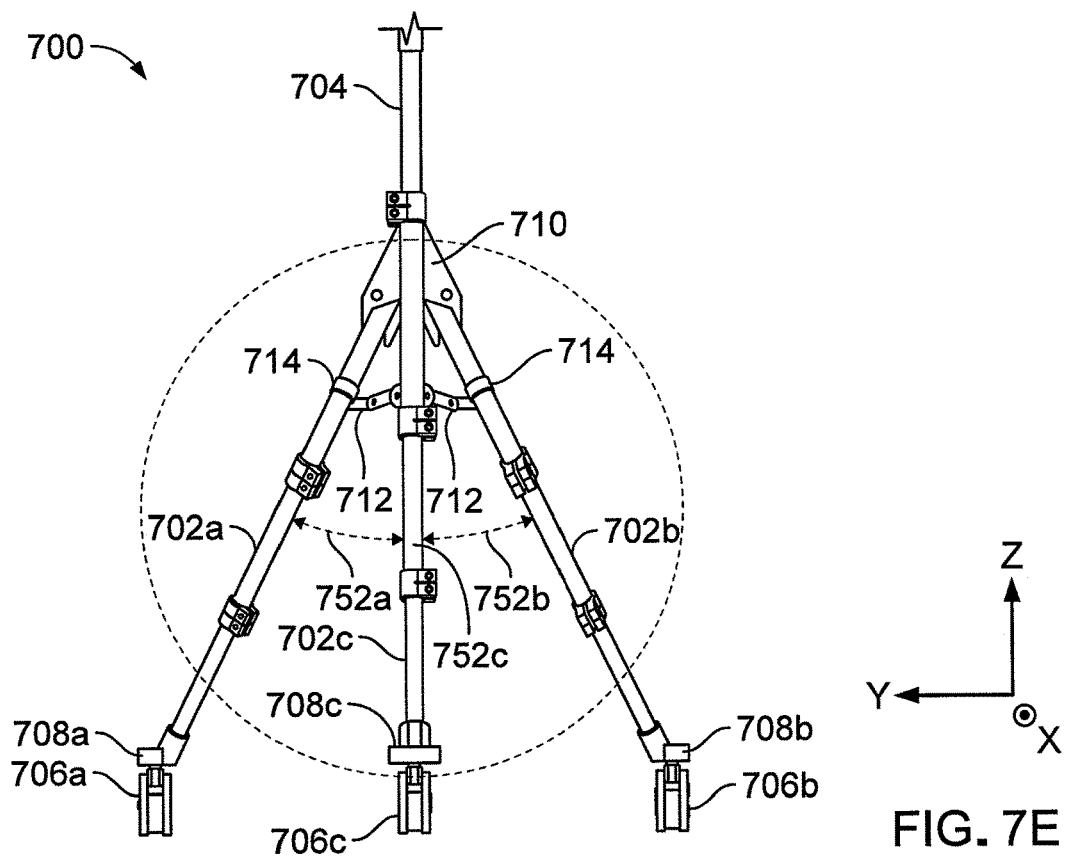

In practice, the pitch angles and roll angles of each of the legs can vary, depending on the implementation. For example, as shown in FIG. 7D, when the multi-legged support frame 700 is in a deployed position (e.g., when the legs 702a-c are fully rotated/folded outward from the multi-legged support frame 700), the pitch angle 750c of the leg 702c can be between 10° and 25° (e.g., 16°), the pitch angle 750b can be between 15° and 30° (e.g., 23°), and the pitch angle 750a of the leg 702a can be between 15° and 30° (e.g., 23°) (obscured in FIG. 7D due to the leg 702b) Further, as shown in FIG. 7E, the roll angle 752c of the leg 702c can be approximately 0°, the roll angle 752a of the leg 702a can be between 10° and 30° (e.g., 24.5°), and the roll angle 752b of the leg 702b can be between 10° and 30° (e.g., 24.5°). In some cases, these angles can be beneficial, as they enable the baby carrier to support the baby stably, and in a position that is comfortable to the adult (e.g., by providing an asymmetrical configuration that positions the baby stably and securely closer to the adult). Although example angles are described above, other angles are also possible, depending on the implementation.

In some cases, to further enhance the stability and safety of the baby carrier 100, the multi-legged support frame 700 can be configured such that it can only extend between particular fixed geometries or physical configurations (e.g., specific ranges in lengths of the legs and/or specific ranges of angles between the legs). For example, during operation, a user can extend the legs 702a-c between a stowed configuration, and a pre-defined "safe" geometry having a desired ground coverage area (e.g., a pre-defined geometry having particular leg lengths and angles between legs that facilitates safe and convenient transportation of a baby, such as the configurations described above). Further, the height of the seat 104 can be adjusted by adjusting the length of the arm segment 704.

The legs 702a-c can include wheels 706a-c at their ends that enable the support frame 700 to roll along the ground (e.g., when pushed or pulled by the user). Further, some or all of the wheels 706a-c can contain braking mechanisms that enable a user to selectively apply braking force to prevent the wheels 706a-c from rolling. In some cases, the wheels 706a and 706b can include braking mechanisms, while the wheels 706c does not contain any braking mechanisms. Further, as shown in FIG. 7A, the legs 702a-c can include protrusions 708a-c positioned above the wheels 706a-c. The protrusions 708a-c can be useful, for example, to protect the wheel from interference (e.g., a user accidentally stepping on the wheels).

The asymmetrical configuration of the support frame 700 can be defined by a hinge mechanism 710 coupling the legs 702a-c and the arm 704 together. The hinge mechanism 710 is shown in greater detail in FIG. 7B. The hinge mechanism 710 includes toggle arms 712 connecting the front leg 702c to each of the side legs 702a and 702b at respective toggle clamps 714 (due to the perspective, only a single side leg 702b and corresponding toggle clamp 714 is shown in FIG. 7B). When the multi-legged support frame 700 is in a stowed position (e.g., as show in FIG. 7B), the toggle arms 712 fold inward against each other. When the multi-legged support frame 700 is in a deployed position (e.g., as show in FIGS. 7A and 7D-7E), the toggle arms 712 fold outward, and are secured by the toggle clamp 714. This configuration provides stability for the multi-legged support frame 700 (e.g., by maintaining the structure at a particular fixed height, while preventing it from rolling apart due to the wheels 706a-c). Further, the hinge mechanism 710 can be configured such that the side legs 702a and 702b can swing outward from the hinge mechanism 710 by a first maximum angle, and such that the front leg 702c can swing outward from the hinge mechanism 710 by a second maximum angle different than the first maximum angle, resulting in an asymmetrical configuration.

In the example shown in FIG. 7A, the baby 200 is positioned such that he is facing away from the user 150. However, as shown in FIG. 7C, the baby carrier 100 also can be used the position the baby 150 such that he towards the user 200.

In the examples shown and described above, a baby carrier includes a support frame (e.g., a monopod support frame and/or multi-legged support frame) that can be reversibly attached to and detached from the baby carrier by the user. However, this need not be the case. For example, in some cases, the baby carrier can include a support frame that is not intended to be detached from the baby carrier by the user. Instead, the support frame can transform between multiple configurations to facilitate storage and transport of the baby carrier itself (e.g., when the baby carrier is in a stowed mode), carrying of a baby (e.g., when the baby carrier is in a carrier mode), and/or transport of a baby (e.g., when the baby carrier is in a stroller mode).

Figure 8B:
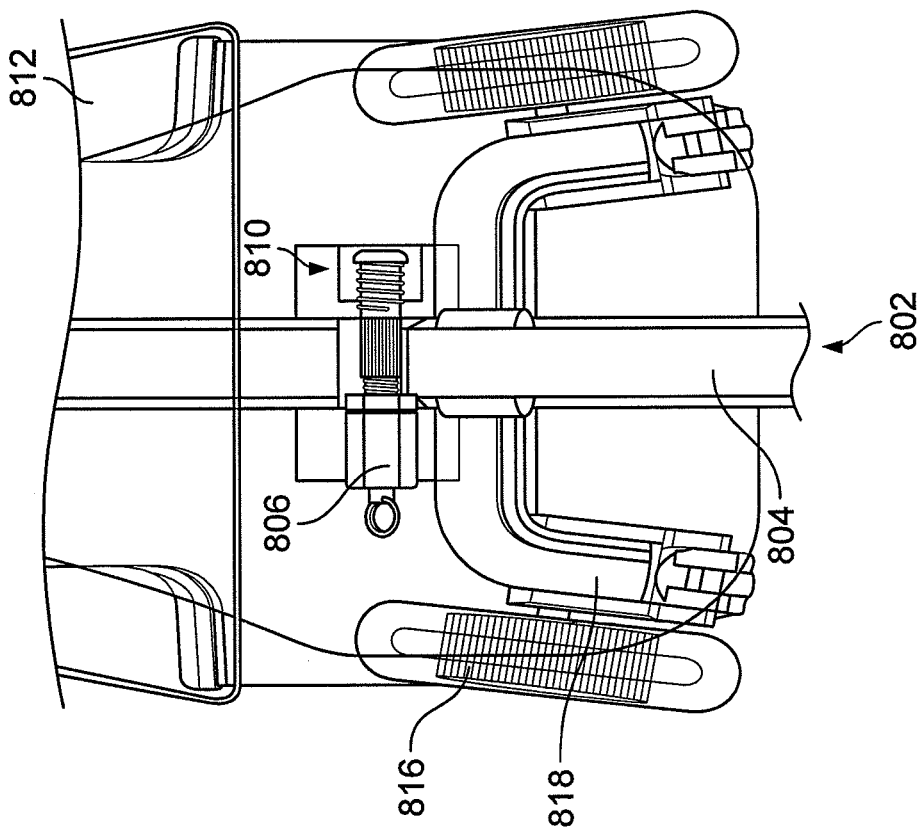
Figure 8A:
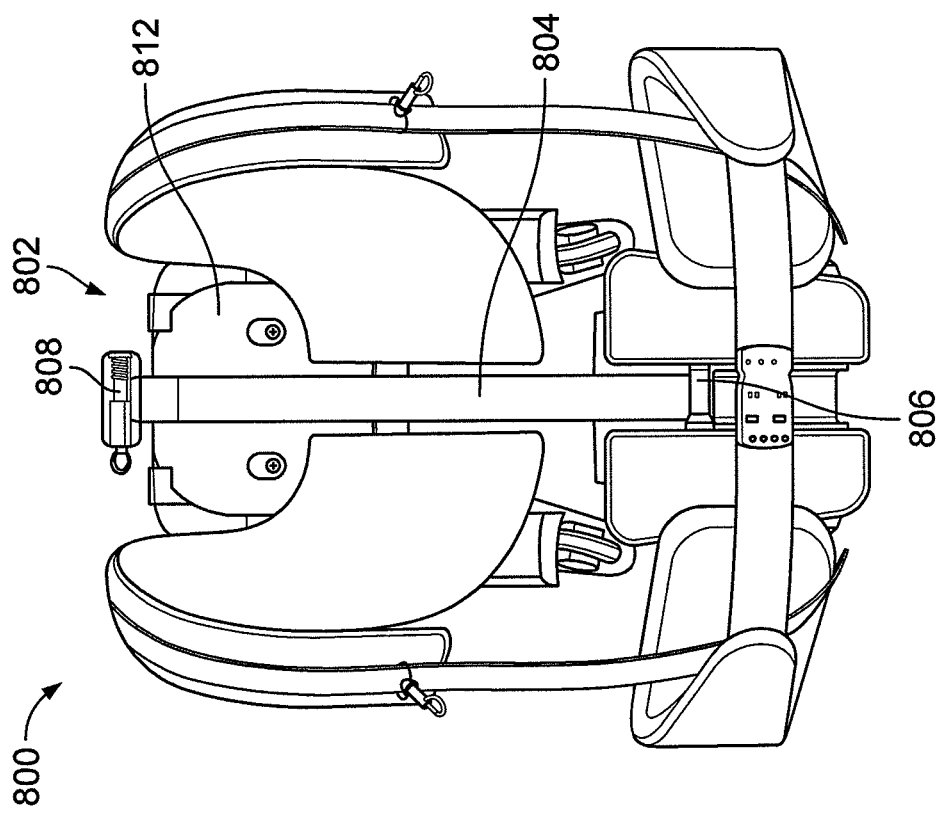

As an example, FIG. 8A shows an example baby carrier 800. In general, the baby carrier 800 can be similar to the baby carrier show and described with respect to FIGS. 1-7. Although, for ease of illustration, the baby carrier 800 is depicted without an enclosure, it is understood that the baby carrier 800 can include an enclosure (e.g., an enclosure 102). However, in this example, the baby carrier includes a transforming support frame 802 in lieu of a monopod support frame 112, a multi-legged support frame 700, and a stroller support frame 110. The support frame 802 includes a support leg 804, a locking hinge 806, a handle 808, wheels 816, and support legs 818.

The support leg 804 is a rigid structure for supporting the weight of the baby carrier 800 and a baby position therein. Further, the support leg 804 enables a user to grasp the baby carrier 800 (e.g., through the handle 808 positioned at the end of the support leg 804) to carry and/or transport the baby carrier 800.

The length of the support leg 804 is adjustable. For example, the support leg 804 can include telescoping structures that enable it to extend and retract in length (e.g., through use of telescoping controls, in a similar manner as described above). As another example, the support leg 804 can include hinged structures that enable it to fold outward or inward to extend or retract in length. In some cases, the support leg 804 can include both telescoping structures and hinged structures that enable it extend or retract in length in different ways.

The locking hinge 806 is securely mounted to the baby carrier 800 and anchors the support leg 804 to the other components of the baby carrier 800. For example, as shown in FIG. 8B, the locking hinge 806 can be embedded within a recess 810 of a back frame 812. Further, the support leg 804 can be securely attached to the locking hinge 806. Accordingly, the support leg 804 is securely attached to the back frame 812, and in turn, the rest of the baby carrier 800.

Further, the locking hinge 806 enables the support leg 804 to pivot with respect to the back frame 812. In some cases, the locking hinge 806 enable the support leg 804 to pivot between at least a first orientation in which the support leg 804 extends in a direction parallel to or approximately parallel to the back frame 812 and extends along a length of the back frame 812, and a second orientation in which the support leg 804 extends in an opposite direction away from the back frame 812. Further, the locking hinge 806 enables the support leg 804 to be securely locked at different orientations with respect to the back frame 812. In some cases, the locking hinge 806 can be a self-locking hexagon spring bolt that can be pushed and pulled by a user to toggle and securely lock the support leg 804 with respect to the back frame 812.

The locking hinge 806 enables the support frame 802 to transform between multiple physical configurations to facilitate storage and transport of the baby carrier itself (e.g., when the baby carrier is in a stowed mode), carrying of a baby (e.g., when the baby carrier is in a carrier mode), and/or transport of a baby (e.g., when the baby carrier is in a stroller mode).

As an example, FIG. 8A shows the support frame 802 in a stowed mode. In an example usage, a user can retract the length of the support leg 804, manipulate the locking hinge 806 to release the support leg 804, and pivot the support leg 804 respect to the back frame 812 such that the support leg 804 extends along the back of the baby carrier 800 (e.g., generally parallel to the back frame 812). Further, the user can manipulate the locking hinge 806 to lock the support leg 804 in this position. In this position, the handle 808 extends from the top of the baby carrier 800, such that the user can grasp it to transport the baby carrier 800 (e.g., to pick it up off the floor and/or carry it around). Further, the user can retract the wheels 816 of the support frame 802 (e.g., by folding the wheels 816 and support legs 818 into the support frame 802 such that they are angled with respect to the back frame 812, such as approximately 90°). In this configuration, the support frame 802 is relatively smaller in size, which also facilitates storage and transport of the baby carrier.

Figure 8C:
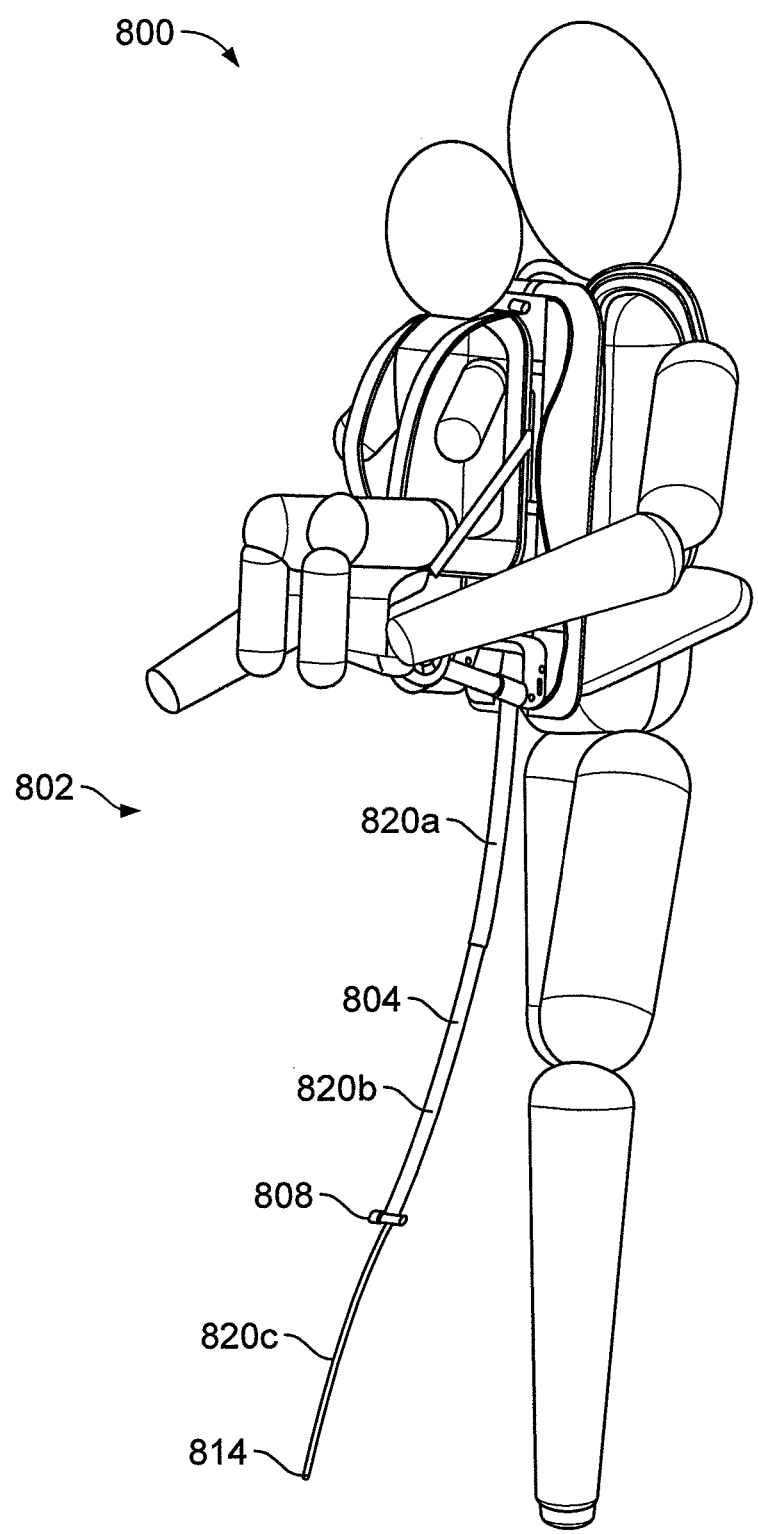

As another example, FIG. 8B shows the support frame 802 in a carrier mode. In an example usage, a user can manipulate the locking hinge 806 to release the support leg 804, and pivot the support leg 804 respect to the back frame 812 such that the support leg 804 extends away from the baby carrier 800. For example, the support 804 can be pivoted 180° from the stowed position, such that it extends in a generally opposite direction as show in FIG. 8A. Further, the user can manipulate the locking hinge 806 to lock the support leg 804 in this position. As shown in FIG. 8C, the user can also extend the length of the support leg 804, and place the end 814 of the support leg 804 on the ground. Accordingly, the baby carrier 800 is propped up by the support frame 802. Further, in a similar manner as described above, the user can secure a baby to the baby carrier 800, and use the baby carrier 800 to carry the baby at a comfortable and convenient position.

Further, as shown in FIG. 8C, when the support leg 804 is extended, the end 814 of the support leg 804 can project beyond the handle 808. This can be useful, for example, as it enables the end 814 to contact the ground, while keeping the handle 808 off the ground (e.g., to prevent it from being damaged). Further, it enables the end 814 and the handle 808 to be used for different purposes, rather than using a common component (which may not be as ideally suited for both tasks).

Figure 8F:
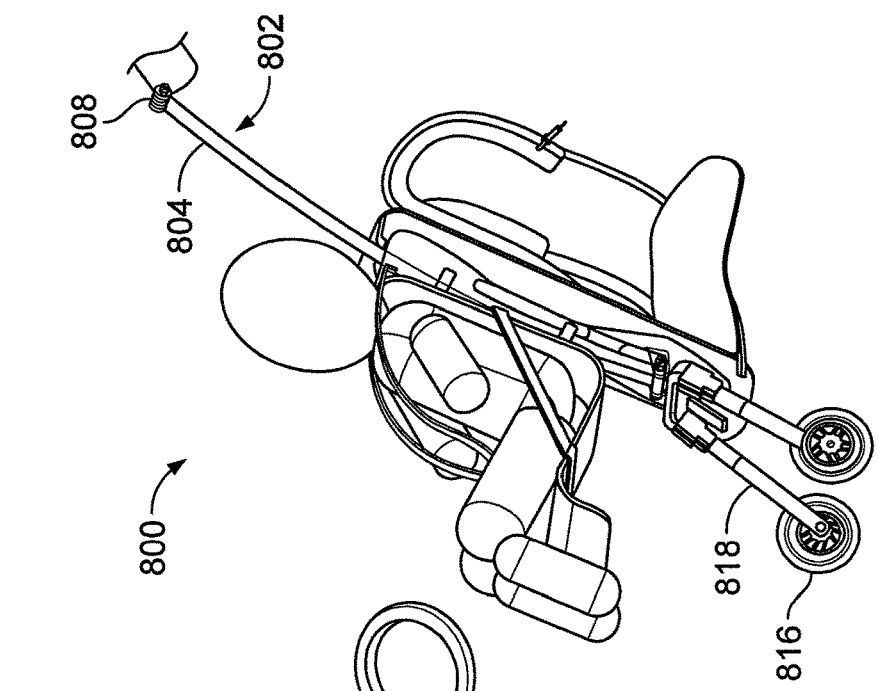

This functionality can be provided in various ways. For example, the support leg 804 can include three leg segments 820a-c. The leg segments 820a and 820b can be telescopic, such that one leg segment (e.g., leg segment 820b) can telescope into another leg segment (e.g., leg segment 820a). The position of the leg segments 820a and 820b relative to one another can be controlled using a telescoping control 822. As shown in FIG. 8D, a telescoping control 822 can include release buttons that, when pressed, enable the leg segments 820a and 820b to telescope relative to one another (e.g., to extend or retract the length of the support leg 804). Further, when the release buttons are released, the telescoping control 822 locks the leg segments 820a and 820b in place relative to one another.

Figure 8E:
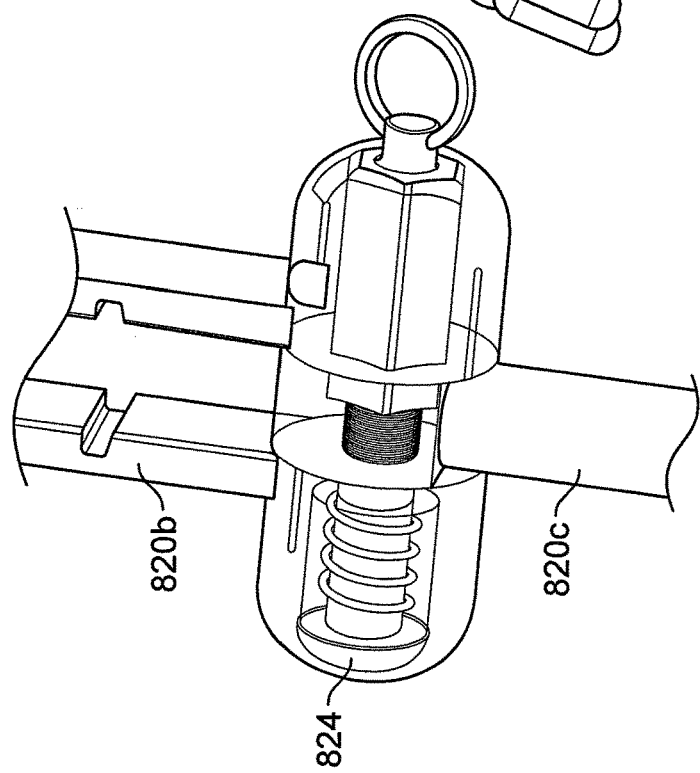
Figure 8D:
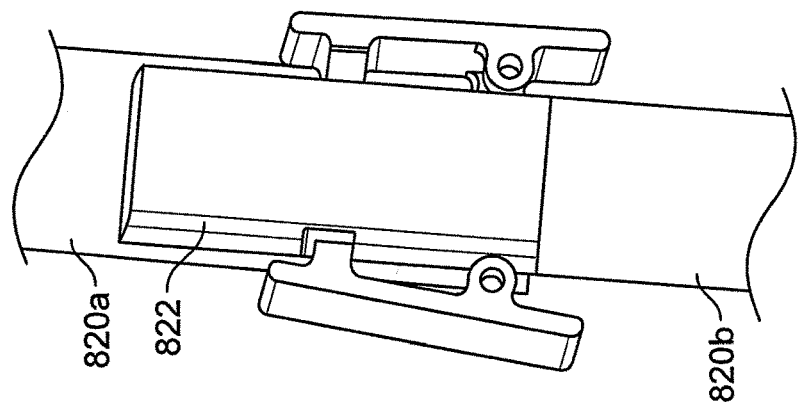

As shown in FIG. 8E, the position of the leg segments 820b and 820c relative to one another can be controlled using a hinge 824. The hinge 824 enables the leg segments 820b to 820c to pivot relative to one another. For example, the leg segment 820c can pivot relative to the leg segment 802b such that they are at an angle of 180° (e.g., to extend the length of the support leg 804), at an angle of 0° (e.g., to retract the length of the support leg 804), or according to some other angle. As shown in FIG. 8E, one of the leg segments (e.g., leg segment 820b) can include two distinct beams, while the other leg segment (e.g., leg segment 802c) can include a single distinct beam sized to fit between the beams of the other. This can be useful, for example, as it enables the leg segments 820b and 820c to fold together when the angle between them is 0°, thereby saving space. In some cases, the hinge 824 can be a self-locking hexagon spring bolt that can be pushed and pulled by a user to toggle and securely lock the leg segments 820b and 820c at different orientations with respect to one another.

Further, as shown in FIG. 8C, the support leg 804 can be curved in shape. For instance, in the carrier mode, the support leg 804 can curve away from the user (e.g., in the direction of the front of the baby carrier 800), such that the support leg 804 does not interfere with the user's legs. Further, the support leg 804 can curve such that the end 814 is approximately positioned at the "ground shadow point" of the center of gravity of the baby carrier (e.g., when a baby is positioned within it). This can be useful, for example, in maintaining the stability of the baby carrier. As an example, when a baby is positioned on the baby carrier, the baby carrier can have a particular center of gravity. Further, the baby carrier will have a particular ground shadow point of the center of gravity, corresponding to the point of intersection between a gravity vector extending from the center of gravity and the ground. The support leg 804 can be configured to curve such that the end of the support leg 804 contacts the ground at the ground shadow point of the center of gravity. Thus, the baby carrier will be more stable during use.

As another example, FIG. 8F shows the support frame 802 in a stroller mode. In an example usage, a user can manipulate the locking hinge 806 to release the support leg 804, and pivot the support leg 804 respect to the back frame 812 such that the support leg 804 extends along the back of the baby carrier 800 (e.g., generally along an upward direction parallel to the back frame 812). Further, the user can manipulate the locking hinge 806 to lock the support leg 804 in this position. Further still, the user can extend the support leg 804 such that the handle 808 extends further away from the baby carrier 800 (e.g., by telescoping the leg segments 802a and 802b apart from one another, while folding the leg segments 802b and 802c against each other). Further, the user can deploy the wheels 816 of the support frame 802 such that the extend away from the baby carrier 800 (e.g., by folding the wheels 816 and support legs 818 away from the support frame 802). Further, in a similar manner as described above, the user can secure a baby to the baby carrier 800, and transport the baby comfortably and conveniently (e.g., by grasping the handle 808 and pushing or pulling the baby carrier 800).

Figure 9A:
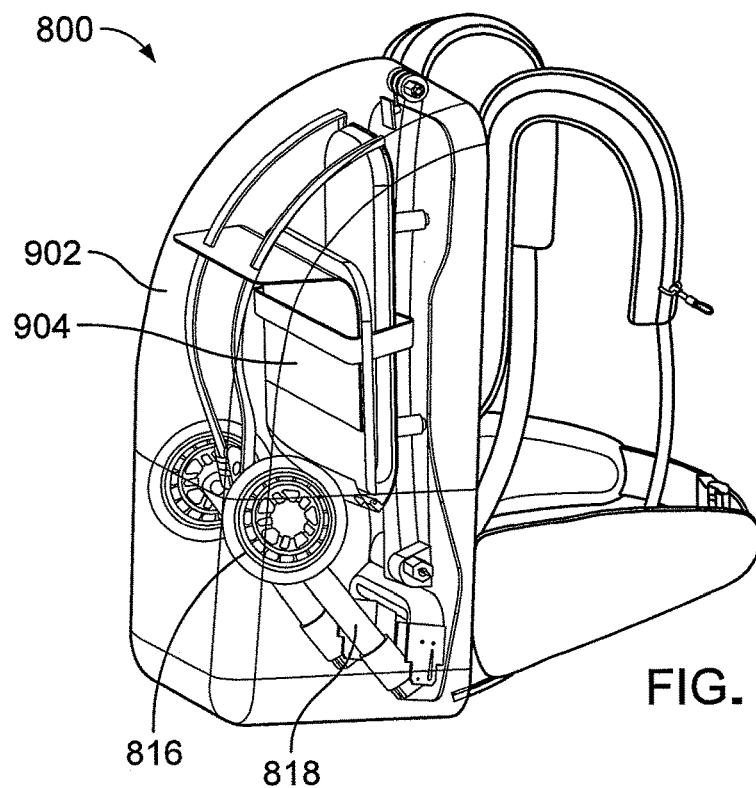
Figure 9B:
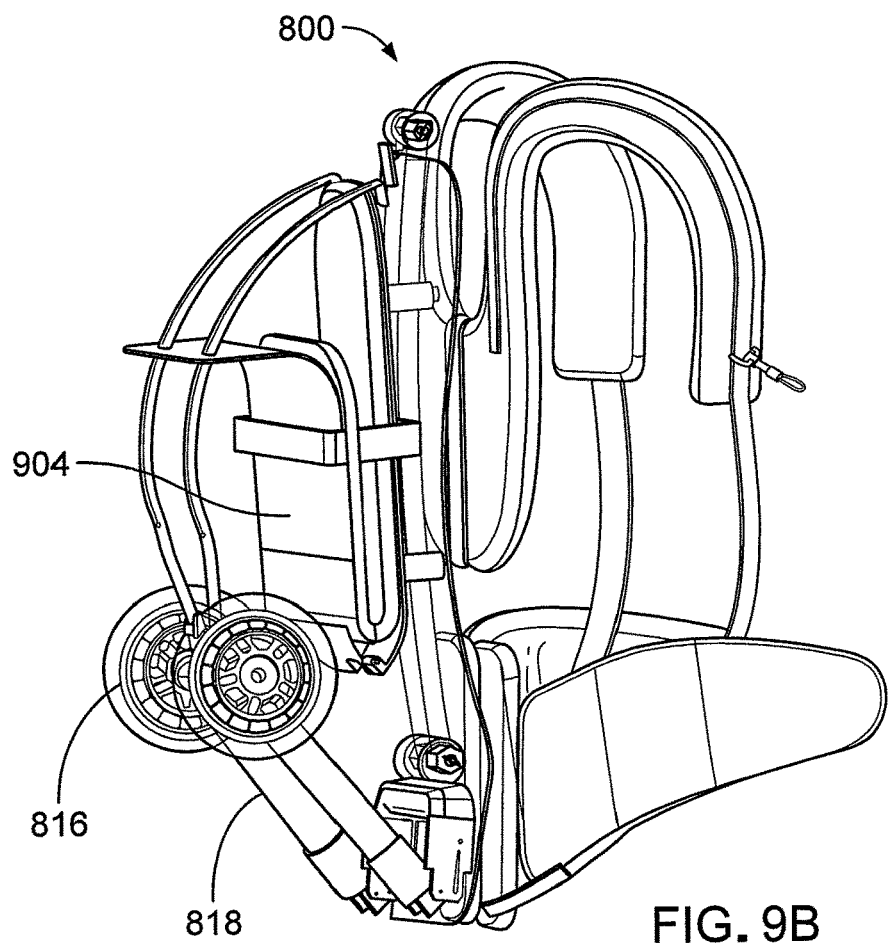

FIG. 9A shows another view of the baby carrier 800 in a stowed mode (depicted with an enclosure 902), and FIG. 9B shows another view of the baby carrier 800 in the stowed mode (depicted without the enclosure 902). As shown in FIGS. 9A and 9B, in a stowed mode, the baby carrier 800 has a relatively compact form, which can facilitate storage and transport of the baby carrier (e.g., while the baby carrier is not being used to carry or transport a baby). For instance, as shown in FIGS. 9A and 9B, the baby carrier 800 includes a foldable baby seat 904 that can be folded together to reduce the size of the baby seat 904. Further, the wheels 816 and support legs 818 are folded, such that they can fit within the enclosure 902.

In a similar manner as described above, the baby carrier 800 can be positioned at different positions on a user's body. For example, the baby carrier 800 can be positioned on a user's back. As another example, the baby carrier 800 can be positioned on a user's chest. Further, in a similar manner as described above, a baby can be securely positioned in the baby carrier 800 such that he faces different directions with respect to the user. For example, the baby can be positioned in the baby carrier 800 such that he faces the user. As another example, the baby can be positioned in the baby carrier 800 such that he faces away from the user.

Figure 10D:
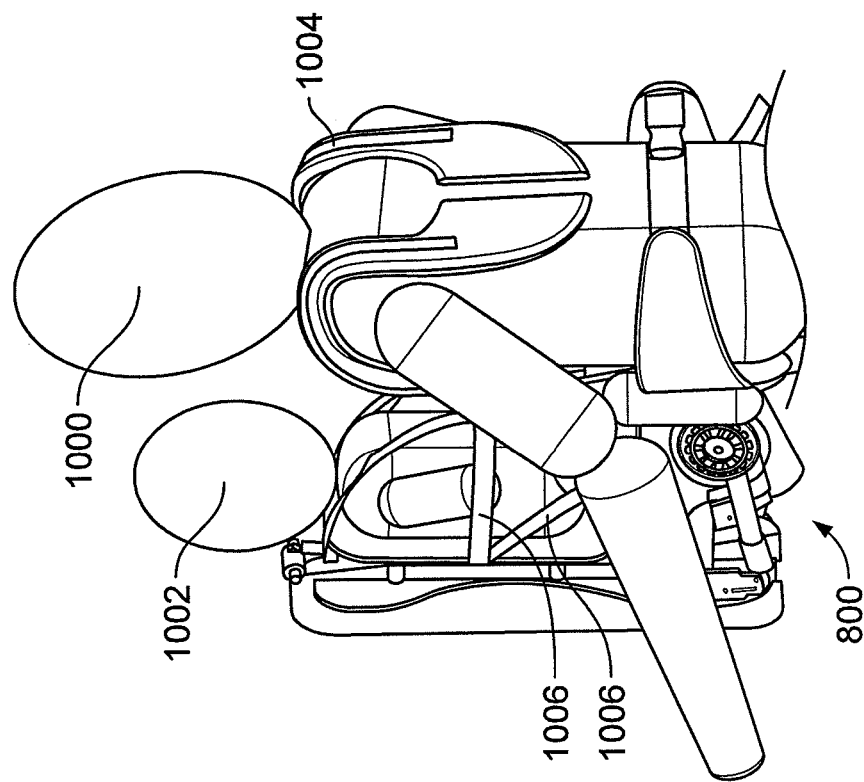
Figure 10C:
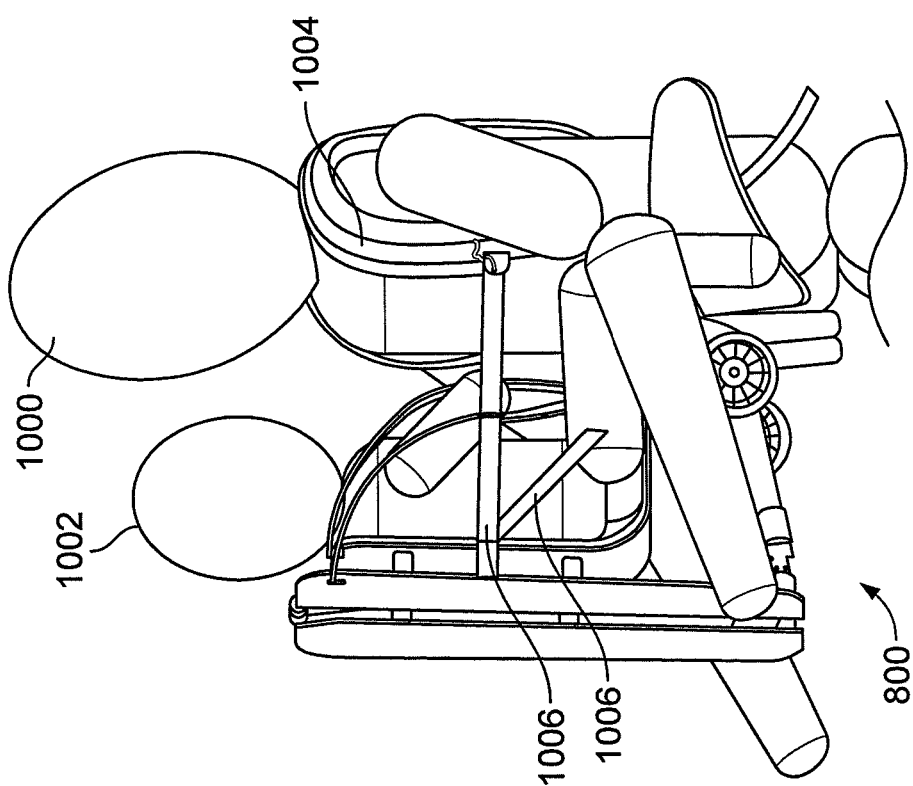

For instance, as shown in FIGS. 10A and 10B, the baby carrier 800 can be positioned on the back of a user 1000, and a baby 1002 can be positioned in the baby carrier 800 such that he faces the user 1000. As another example, as shown in FIGS. 10C and 10D, the baby carrier 800 can be positioned on the front of a user 1000, and a baby 1002 can be positioned in the baby carrier 800 such that he faces the user 1000.

In some cases, to facilitate positioning the baby carrier 800 to different parts of the user's body, the user support harness of the baby carrier 800 can be reversibly detached and reattached to the baby carrier 800. For example, as shown in FIGS. 10A-10D, the baby carrier 800 can include a user support harness 1004. The user support harness 1004 can be similar to that described with respect to FIGS. 1-7. Further, the user can detach the user support harness 1004 from the baby carrier 800 and reattach the user support harness 1004 at a different position with respect to the baby carrier 800, such that the user can securely position the baby carrier 800 against her body according to a new orientation. Further, the baby carrier 800 can include additional support straps 1006 to further secure the baby carrier 800 according to the desired orientation. In some cases, these support straps 1006 also can be reversibly detached and reattached to the baby carrier 800, such that the user can securely position the baby carrier 800 against her body according to the desired orientation A number of embodiments have been described. Nevertheless, it will be understood that various modifications may be made without departing from the spirit and scope of the invention. Accordingly, other embodiments are within the scope of the following claims.

What is claimed is:

1. A baby carrier comprising:
an enclosure;
a seat configured to receive a baby;
a back frame; and
a first support frame comprising:
an extendable arm having a handle;
a first hinged leg; and
a first wheel mounted to the first hinged leg;
wherein the baby carrier is configured to reversibly transition between at least a stowed mode, a stroller mode, and a carrier mode;
wherein in the stowed mode of the baby carrier:
the first hinged leg is positioned at a first angle relative to the back frame,
the extendable arm has a first length, and
the enclosure encloses at least a portion of the seat, the back frame, and the first support frame,
wherein in the stroller mode of the baby carrier:
the first hinged leg is positioned at a second angle relative to the back frame, the second angle greater than the first angle;
the extendable arm has a second length greater than the first length, and
the seat is exposed, at least in part, by the enclosure, and wherein in the carrier mode of the baby carrier:
the first hinged leg is positioned at the first angle relative to the back frame,
the extendable arm has the first length, and
the seat is exposed, at least in part, by the enclosure.

2. The baby carrier of claim 1, wherein the baby carrier further comprises a second support frame, and
wherein in the carrier mode of the baby carrier, the second support frame is coupled to the seat, and extends in a direction away from the seat, and wherein the second support frame is configured to support the baby carrier vertically from the ground.

3. The baby carrier of claim 1, wherein the extendable arm is configured to pivot with respect to the back frame.

4. The baby carrier of claim 3, wherein in the stroller mode of the baby carrier, the extendable arm is positioned parallel to the back frame and extends along a length of the back frame in a first direction, and
wherein in the carrier mode of the baby carrier, the extendable arm extends away from the back frame in a second direction opposite the first direction.

5. The baby carrier of claim 1, wherein the baby carrier further comprises a second hinged leg and a second wheel mounted to the second leg;
wherein in the stowed mode of the baby carrier, the second hinged leg is positioned at the first angle relative to the back frame, and
wherein in the stroller mode of the baby carrier, the second hinged leg is positioned at the second angle relative to the back frame.

6. The baby carrier of claim 1, further comprising a baby support harness configured to secure the baby to the seat.

7. The baby carrier of claim 1, further comprising a user support harness configured to secure a user to the baby carrier, the user being different than the baby.

8. The baby carrier of claim 1, wherein in the stowed mode of the baby carrier, the baby carrier entirely encloses at least the seat.

9. The baby carrier of claim 1, wherein the extendable arm is configured to extend in a first direction away from the back frame, and
wherein when the first hinged leg is positioned at the second angle relative to the back board, the first hinged leg extends in a second direction away from the back board, the second direction being opposite the first direction.

10. The baby carrier of claim 2, wherein the second support frame is adjustable in length.

11. The baby carrier of claim 2, wherein the second support frame comprises a monopod leg.

12. The baby carrier of claim 2, wherein the second support frame comprises three support legs.

13. The baby carrier of claim 12, wherein the second support frame comprises an additional wheel mounted to each support leg of the support frame.

14. The baby carrier of claim 2, wherein the second support frame is reversibly detachable from the seat.

15. The baby carrier of claim 1, wherein the seat is foldable.

* * * * *